United States Patent
Maruyama

(10) Patent No.: US 11,996,763 B2
(45) Date of Patent: May 28, 2024

(54) INTEGRATED CIRCUIT AND POWER SUPPLY CIRCUIT

(71) Applicant: FUJI ELECTRIC CO., LTD., Kawasaki (JP)

(72) Inventor: Hiroshi Maruyama, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 17/972,279

(22) Filed: Oct. 24, 2022

(65) Prior Publication Data
US 2023/0198411 A1 Jun. 22, 2023

(30) Foreign Application Priority Data
Dec. 20, 2021 (JP) .................................. 2021-206416

(51) Int. Cl.
*H02M 1/08* (2006.01)
*H02M 3/335* (2006.01)
*H02M 7/12* (2006.01)

(52) U.S. Cl.
CPC ............. *H02M 1/08* (2013.01); *H02M 3/335* (2013.01); *H02M 7/125* (2013.01)

(58) Field of Classification Search
CPC ................................ H02M 1/08; H02M 7/125
USPC ......................................... 327/109; 363/147
See application file for complete search history.

(56) References Cited

U.S. PATENT DOCUMENTS

| | | | |
|---|---|---|---|
| 2012/0049823 A1* | 3/2012 | Chen ..................... | H02M 3/157 323/282 |
| 2012/0104968 A1* | 5/2012 | Shiu ...................... | H05B 45/44 315/291 |
| 2014/0185340 A1 | 7/2014 | Maruyama | |
| 2022/0166303 A1* | 5/2022 | Matsumoto ....... | H02M 3/33523 |
| 2023/0009994 A1* | 1/2023 | Yabuzaki .......... | H02M 3/33523 |
| 2023/0010211 A1* | 1/2023 | Yabuzaki ............ | H02M 1/0003 |
| 2023/0051610 A1* | 2/2023 | Matsumoto ....... | H02M 3/33571 |
| 2023/0124433 A1* | 4/2023 | Yamane ............. | H02M 1/0032 363/21.12 |

FOREIGN PATENT DOCUMENTS

JP 2014-131380 A 7/2014

* cited by examiner

*Primary Examiner* — William Hernandez
(74) *Attorney, Agent, or Firm* — Rabin & Berdo, P.C.

(57) ABSTRACT

An integrated circuit configured to switch a transistor in a power supply circuit. The integrated circuit includes a first terminal to which a first resistor is coupled; a first detection circuit configured to detect whether a load of the power supply circuit is in an overload state; a second detection circuit configured to detect whether a current flowing through the transistor is overcurrent; an oscillator circuit configured to output an oscillator signal with a cycle corresponding to a first resistance value of the first resistor; and a driving signal output circuit configured to output a driving signal to turn on the transistor, based on the oscillator signal, and turn off the transistor, based on a feedback voltage corresponding to the output voltage. The driving signal output circuit further outputs the driving signal to turn off the transistor, in response to the current flowing through the transistor reaching overcurrent.

8 Claims, 17 Drawing Sheets

| Rrt  | F1 | F2 | F3 |
|------|----|----|----|
| Rrt0 | H  | H  | H  |
| Rrt1 | L  | H  | H  |
| Rrt2 | L  | L  | H  |
| Rrt3 | L  | L  | L  |

(Rrt0 > Rrt1 > Rrt2 > Rrt3)

FIG. 5

| F1 | F2 | F3 | Fosc |
|----|----|----|------|
| H  | H  | H  | Fosc0 |
| L  | H  | H  | Fosc1 |
| L  | L  | H  | Fosc2 |
| L  | L  | L  | Fosc3 |

(Fosc0 > Fosc1 > Fosc2 > Fosc3)

FIG. 11

INTEGRATED CIRCUIT AND POWER SUPPLY CIRCUIT

CROSS-REFERENCE TO RELATED APPLICATION

The present application claims priority pursuant to 35 U.S.C. § 119 from Japanese patent application number 2021-206416 filed on Dec. 20, 2021, the entire disclosure of which is hereby incorporated by reference herein.

BACKGROUND

Technical Field

The present disclosure relates to an integrated circuit and a power supply circuit.

Description of the Related Art

There is an integrated circuit for a power supply circuit that implements drooping characteristics, which lower the output voltage of an AC-DC converter responsive to a load of the AC-DC converter becoming an overload state (for example, Japanese Patent Application Publication No. 2014-131380).

Some integrated circuits change a switching cycle depending on whether the load is in an overload state. In this case, when the integrated circuit is set to a mode in which the load is in an overload state, the integrated circuit operates so as to increase the switching cycle. However, the switching cycle of the transistor may abruptly change when the integrated circuit enters this mode.

SUMMARY

A first aspect of an embodiment of the present disclosure is an integrated circuit for a power supply circuit configured to generate an output voltage from an input voltage thereof, the power supply circuit including a transformer including a primary coil, a secondary coil, and an auxiliary coil, a transistor configured to control a current flowing through the primary coil, and a first resistor having a first resistance value, the integrated circuit being configured to switch the transistor, the integrated circuit comprising: a first terminal to which the first resistor is coupled; a first detection circuit configured to detect whether a load of the power supply circuit is in an overload state; a second detection circuit configured to detect whether a current flowing through the transistor is overcurrent; an oscillator circuit configured to output an oscillator signal with a cycle corresponding to the first resistance value of the first resistor; and a driving signal output circuit configured to output a driving signal to turn on the transistor, based on the oscillator signal, and output the driving signal to turn off the transistor, based on a feedback voltage corresponding to the output voltage, wherein the driving signal output circuit further outputs the driving signal to turn off the transistor, in response to the current flowing through the transistor reaching overcurrent, and the oscillator circuit includes a first current source configured to output a first current, based on the first resistance value, a second current source configured to output a second current, based on the first resistance value, an adjustment circuit configured to adjust the second current based on a voltage corresponding to a period of time during which the transistor is on in a cycle of the driving signal, to thereby cause the second current to decrease, in response to the load becoming the overload state, and a first output circuit configured to output the oscillator signal with an on period corresponding to a current value of the first current and an off period corresponding to a current value of the second current.

A second aspect of an embodiment of the present disclosure is a power supply circuit configured to generate an output voltage from an input voltage thereof, the power supply circuit comprising: a transformer including a primary coil, a secondary coil, and an auxiliary coil; a transistor configured to control a current flowing through the primary coil; a first resistor having a first resistance value; and an integrated circuit configured to switch the transistor, wherein the integrated circuit includes a first terminal to which the first resistor is coupled, a first detection circuit configured to detect whether a load of the power supply circuit is in an overload state, a second detection circuit configured to detect whether a current flowing through the transistor is overcurrent, an oscillator circuit configured to output an oscillator signal with a cycle corresponding to the first resistance value of the first resistor, and a driving signal output circuit configured to output a driving signal to turn on the transistor, based on the oscillator signal, and output the driving signal to turn off the transistor, based on a feedback voltage corresponding to the output voltage, the driving signal output circuit being further configured to output the driving signal to turn off the transistor, in response to the current flowing through the transistor reaching overcurrent, wherein the oscillator circuit includes a first current source configured to output a first current, based on the first resistance value, a second current source configured to output a second current, based on the first resistance value, an adjustment circuit configured to adjust the second current based on a voltage corresponding to a period of time during which the transistor is on in a cycle of the driving signal, to thereby cause the second current to decrease, in response to the load becoming the overload state, and a first output circuit configured to output the oscillator signal with an on period corresponding to a current value of the first current and an off period corresponding to a current value of the second current.

BRIEF DESCRIPTION OF THE DRAWINGS

FIG. 5 is a diagram illustrating a relationship between a resistance value Rrt of a resistor 41 and signals F1 to F3.

FIG. 11 is a diagram illustrating a relationship between signals F1 to F3 and an oscillation frequency Fosc.

DETAILED DESCRIPTION

At least following matters will become apparent from the descriptions of the present specification and the accompanying drawings.

Embodiments

Overview of AC-DC Converter 10

Figure 1:
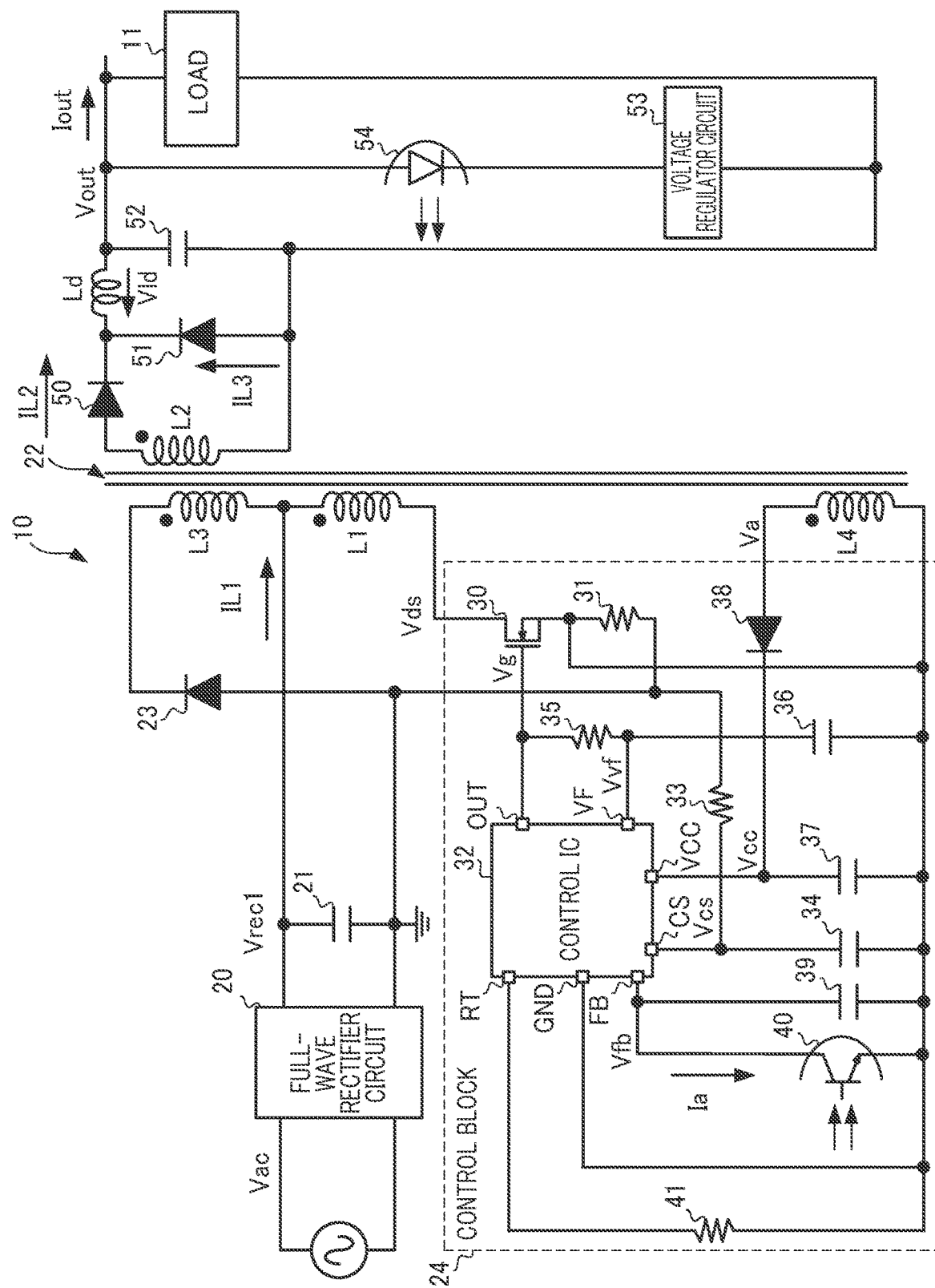
FIG. 1 is a diagram illustrating an example of an AC-DC converter 10.

FIG. 1 is a diagram illustrating an example of a configuration of an AC-DC converter 10 which is an embodiment of the present disclosure. The AC-DC converter 10 is a forward power supply circuit that generates an output voltage Vout at a target level from an alternating-current (AC) voltage Vac of a commercial power supply, and the output voltage Vout has drooping characteristics.

The AC-DC converter 10 includes a full-wave rectifier circuit 20, capacitors 21 and 52, a transformer 22, diodes 23, 50, and 51, a control block 24, a coil Ld, a voltage regulator circuit 53, and a light-emitting diode 54. A load 11 is coupled to the AC-DC converter 10, to receive power from the AC-DC converter 10, and the output voltage Vout is applied to the load 11. Note that a current flowing through the load 11 is referred to as load current Iout.

The full-wave rectifier circuit 20 full-wave rectifies a predetermined AC voltage Vac that is an input voltage thereof and applies a resultant voltage as a voltage Vrec1 to a primary coil L1 and a reset winding L3 of the transformer 22 and the capacitor 21. The capacitor 21 smooths the voltage Vrec1. Note that the AC voltage Vac is a voltage with an effective value in a range of 100 to 240 V and a frequency in a range of 50 to 60 Hz, for example.

The transformer 22 includes the primary coil L1 provided on an input side, a secondary coil L2 magnetically coupled to the primary coil L1, the reset winding L3, and an auxiliary coil L4. In this case, the secondary coil L2, the reset winding L3, and the auxiliary coil L4 are wound such that voltages generated at the secondary coil L2, the reset winding L3, and the auxiliary coil L4 have the same polarity as the polarity of a voltage generated at the primary coil L1. In addition, the primary coil L1, the reset winding L3, and the auxiliary coil L4 are provided on the input side (primary side), and the secondary coil L2 is provided on an output side (secondary side).

The diode 23 is an element to reset magnetism remaining in the transformer 22 with the reset winding L3, when a power transistor 30 (described later) is turned off. The diode 23 is provided between a ground terminal of the capacitor 21 and the reset winding L3. Upon turning off of the power transistor 30, the diode 23 is turned on, and a current flowing through the diode 23 flows through the reset winding L3. In this case, a voltage Vds on a drain side of the power transistor 30 is twice the rectified voltage Vrec1.

Thereafter, an inductor current IL1 flowing through the primary coil L1 on the primary side of the transformer 22 flows in a negative direction. Accordingly, the charge accumulated in the parasitic capacitance of the power transistor 30 is discharged. Then, the voltage Vds results in the rectified voltage Vrec1. Note that an operation of the AC-DC converter 10 will be described later in detail.

The control block 24 controls the inductor current IL1, to thereby control the voltage generated at the secondary coil L2 on the secondary side of the transformer 22.

The diode 50 rectifies an inductor current IL2 from the secondary coil L2 of the transformer 22, and supplies a resultant current to the capacitor 52 through the coil Ld. Likewise, the diode 51 rectifies an inductor current IL3 from the secondary coil L2, and supplies a resultant current to the capacitor 52 through the coil Ld. The capacitor 52 is charged with the currents from the diodes 50 and 51, and thus the output voltage Vout is generated between terminals of the capacitor 52.

The voltage regulator circuit 53 generates a constant direct-current (DC) voltage, and is configured using a shunt regulator, for example.

The light-emitting diode 54 is an element to emit light of an intensity corresponding to a difference between the output voltage Vout and an output of the voltage regulator circuit 53, and configures a photocoupler with a phototransistor 40 which will be described later. In an embodiment of the present disclosure, as the level of the output voltage Vout rises higher, the intensity of the light from the light-emitting diode 54 increases more.

Overview of Control Block 24

The control block 24 is a circuit block to control the AC-DC converter 10. The control block 24 includes the power transistor 30, resistors 31, 33, 35, and 41, a control integrated circuit (IC) 32, capacitors 34, 36, 37, and 39, a diode 38, and the phototransistor 40.

The power transistor 30 is an N-channel metal-oxide-semiconductor (NMOS) transistor to control the power supplied to the load 11, and controls the inductor current IL1 flowing through the primary coil. Note that, in an embodiment of the present disclosure, the power transistor 30 is a metal oxide semiconductor (MOS) transistor; however, it is not limited thereto. The power transistor 30 may be other transistors, such as a bipolar transistor or the like, as long as the power transistor 30 is a transistor capable of controlling the power.

The resistor 31 detects the inductor current IL1 (i.e., a current flowing through the power transistor 30) flowing through the primary coil L1 when the power transistor 30 is turned on. The resistor 31 has one end coupled to a source electrode of the power transistor 30 and to the ground, and the other end coupled to an anode of the diode 23.

The control IC 32 is an integrated circuit that switches the power transistor 30 to generate the output voltage Vout. Specifically, the control IC 32 switches the power transistor 30 based on a feedback voltage Vfb.

Note that the control IC 32 has terminals CS, FB, VF, OUT, VCC, RT, and GND, and the control IC 32 will be described later in detail. Note that the power transistor 30 has a gate electrode coupled to the terminal OUT, and is switched by a driving voltage Vg. Although the actual control IC 32 also has other terminals, they are omitted for convenience of explanation. Note that the terminal GND is grounded through the resistor 31.

The capacitor 34 has one end coupled to the terminal CS and the other end coupled to the ground through the resistor 31, and a voltage at the resistor 31 that is generated with the inductor current IL1 flowing is applied through the resistor 33. Note that the resistor 33 and the capacitor 34 configure a low-pass filter, and stabilize a voltage Vcs at the terminal CS.

The capacitor 36 has one end coupled to the terminal VF and the other end coupled to the ground through the resistor 31, and the driving voltage Vg is applied through the resistor 35. Note that the resistor 35 and the capacitor 36 configure a low-pass filter, and stabilize a voltage Vvf at the terminal VF. Note that the voltage Vvf is a voltage corresponding to a period of time during which the power transistor 30 is on in a cycle of a driving signal Vq1 (described later).

The capacitor 37 has one end coupled to the terminal VCC, and the other end coupled to the ground through the resistor 31. The diode 38 has an anode coupled to the auxiliary coil L4, and a cathode coupled to the terminal VCC.

A voltage Va generated at the auxiliary coil L4 is applied to the capacitor 37 through the diode 38. Note that the capacitor 37 to receive a voltage based on the voltage Va of the auxiliary coil L4 when the power transistor 30 is on is coupled to the terminal VCC, and this voltage results in a power supply voltage Vcc.

The capacitor 39 has one end coupled to the terminal FB and the other end coupled to the ground through the resistor 31, and stabilizes the voltage Vfb at the terminal FB. The voltage Vfb is a feedback voltage corresponding to the output voltage Vout, and is applied to the terminal FB.

The phototransistor 40 has one end coupled to the terminal FB and the other end coupled to the ground through the resistor 31, and receives the light from the light-emitting diode 54. In addition, as the intensity of the light emitted by the light-emitting diode 54 increases, the phototransistor 40 passes a larger sink current Ia to the terminal FB. As a result, the feedback voltage Vfb drops, which will be described later in detail.

The resistor 41 has one end coupled to the terminal RT and the other end coupled to the ground through the resistor 31. Note that the resistor 41 corresponds to a "first resistor", and the terminal RT corresponds to a "first terminal".

Drooping Characteristics of Output Voltage Vout Outputted from AC-DC Converter 10

The AC-DC converter 10 according to an embodiment of the present disclosure supplies power to the load 11, which will be described later in detail. When a large amount of the load current Iout flows through the load 11 (i.e., the load 11 is in a first load state or a heavy load state) and the AC-DC converter 10 keeps outputting the output voltage Vout at a target level Vout_target, the load 11 may be broken. In such a case, the AC-DC converter 10 may cause the output voltage Vout to have the drooping characteristics, in general.

Note that the phrase "the load 11 is in the first load state or the heavy load state" indicates a case in which the current value of the load current Iout flowing through the load 11 is larger than a predetermined value (e.g., 1 A), for example. Note that the predetermined value (e.g., 1 A) in this case is smaller than a predetermined value Iout_limit (described later). In addition, the phrase "the load 11 is in an overload state" indicates a case in which the current value of the load current Iout flowing through the load 11 is larger than the predetermined value Iout_limit, for example.

Moreover, the phrase "the load 11 is in a second load state or a light load state" indicates a case in which the current value of the load current Iout flowing through the load 11 is smaller than a predetermined value (e.g., 1 A), for example. Furthermore, the phrase "the load 11 is in no load state" indicates a case in which the current value of the load current Iout flowing through the load 11 is extremely small or 0 (zero) A. A description has been given such that the current value of the load current Iout to determine whether the load 11 is the heavy load state or light load state is 1 A, for example; however, this current value may be set to various values.

Figure 2:
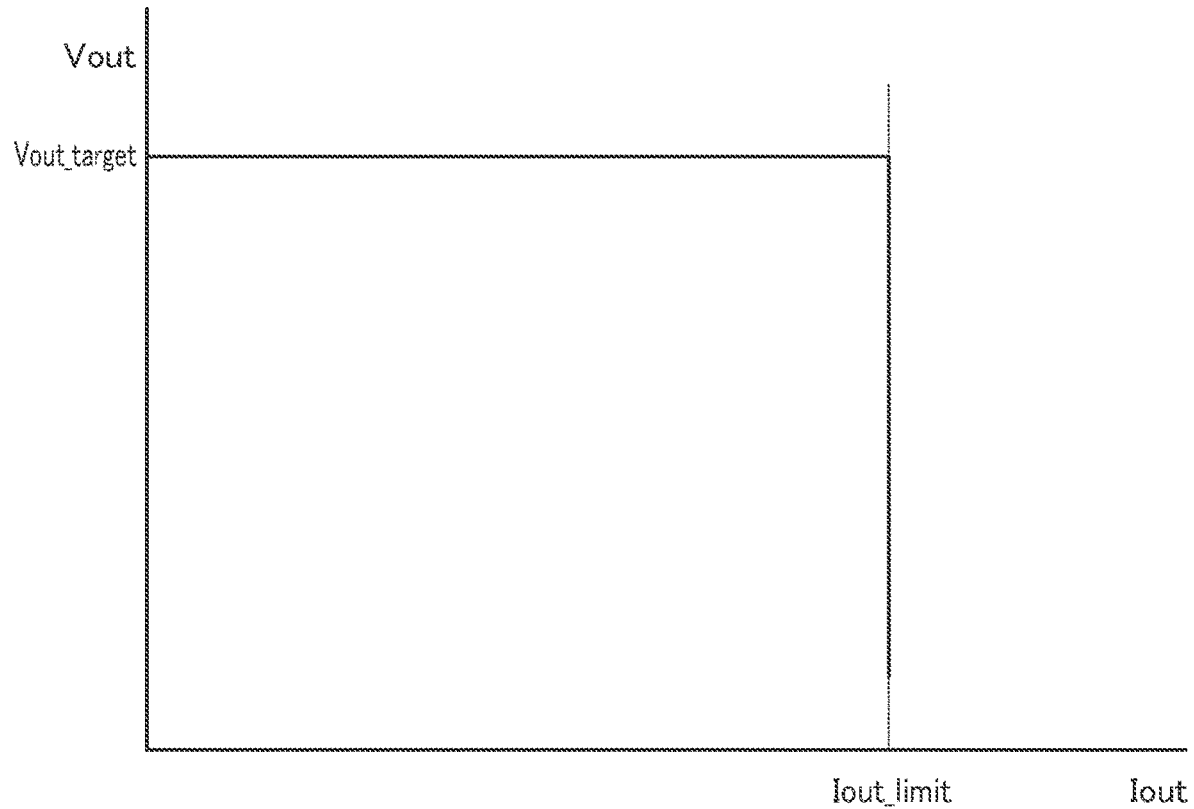
FIG. 2 is a diagram illustrating drooping characteristics of an AC-DC converter 10.

As illustrated in FIG. 2, when the load current Iout is smaller than the predetermined value Iout_limit, the AC-DC converter 10 maintains the output voltage Vout at the target level Vout_target. On the other hand, when the load current Iout is larger than the predetermined value Iout_limit, the AC-DC converter 10 lowers the output voltage Vout.

Configuration of Control IC 32

Figure 3:
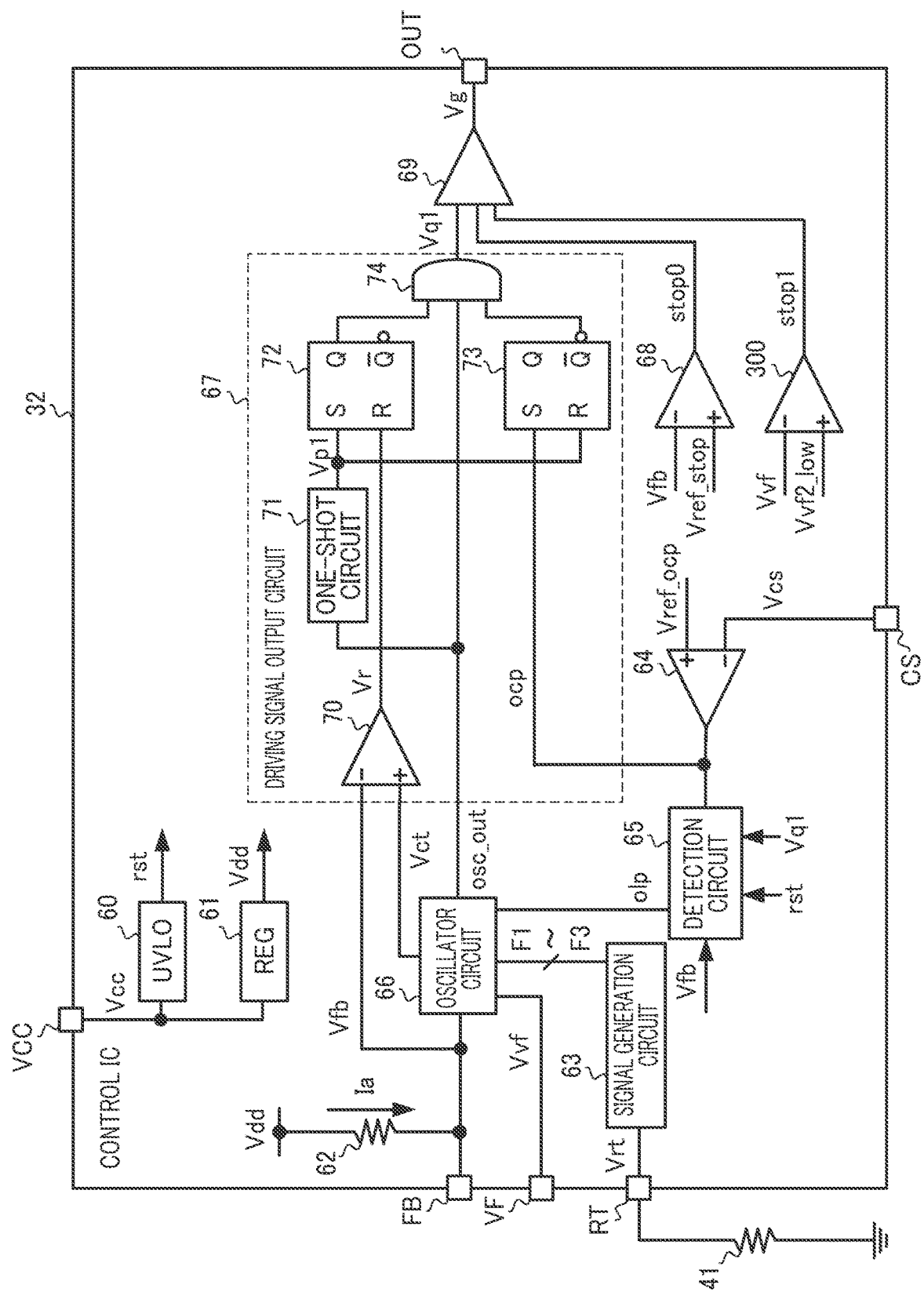
FIG. 3 is a diagram illustrating an example of a control IC 32.

FIG. 3 is a diagram illustrating an example of a configuration of the control IC 32. The control IC 32 switches the power transistor 30 based on the feedback voltage Vfb to generate the output voltage Vout.

The control IC 32 includes an undervoltage lockout circuit (UVLO) 60, an internal power supply (REG) 61, a resistor 62, a signal generation circuit 63, comparators 64, 68, and 300, a detection circuit 65, an oscillator circuit 66, a driving signal output circuit 67, and a buffer 69.

Undervoltage Lockout Circuit 60

The undervoltage lockout circuit 60 outputs a signal rst based on the power supply voltage Vcc. Specifically, in response to the level of the voltage Vcc reaching a predetermined level Voff, the undervoltage lockout circuit 60 outputs a low signal rst to stop switching the power transistor 30.

On the other hand, in response to the level of the voltage Vcc reaching a predetermined level Von higher than the predetermined level Voff, the undervoltage lockout circuit 60 outputs a high signal rst allowing the switching of the power transistor 30.

Internal Power Supply 61

The internal power supply 61 outputs a power supply voltage Vdd based on the power supply voltage Vcc.

Resistor 62

The resistor 62 is an element to generate the feedback voltage Vfb, and has one end to receive the power supply voltage Vdd and the other end coupled to the terminal FB. The sink current Ia flows through the resistor 62, and the feedback voltage Vfb is generated based on a voltage generated at the resistor 62.

Specifically, in response to the intensity of the light from the light-emitting diode 54 in FIG. 1 increasing, the phototransistor 40 passes a large amount of the sink current Ia to the terminal FB. Thus, the voltage generated at the resistor 62 rises, and the feedback voltage Vfb drops.

Signal Generation Circuit 63

The signal generation circuit 63 outputs a signal to set an oscillation frequency Fosc of the oscillator circuit 66 (described later). Specifically, the signal generation circuit 63 outputs signals F1 to F3 to set the oscillation frequency Fosc of oscillator signals Vct and osc_out (described later) according to a resistance value Rrt of the resistor 41 coupled to the terminal RT.

Figure 4:
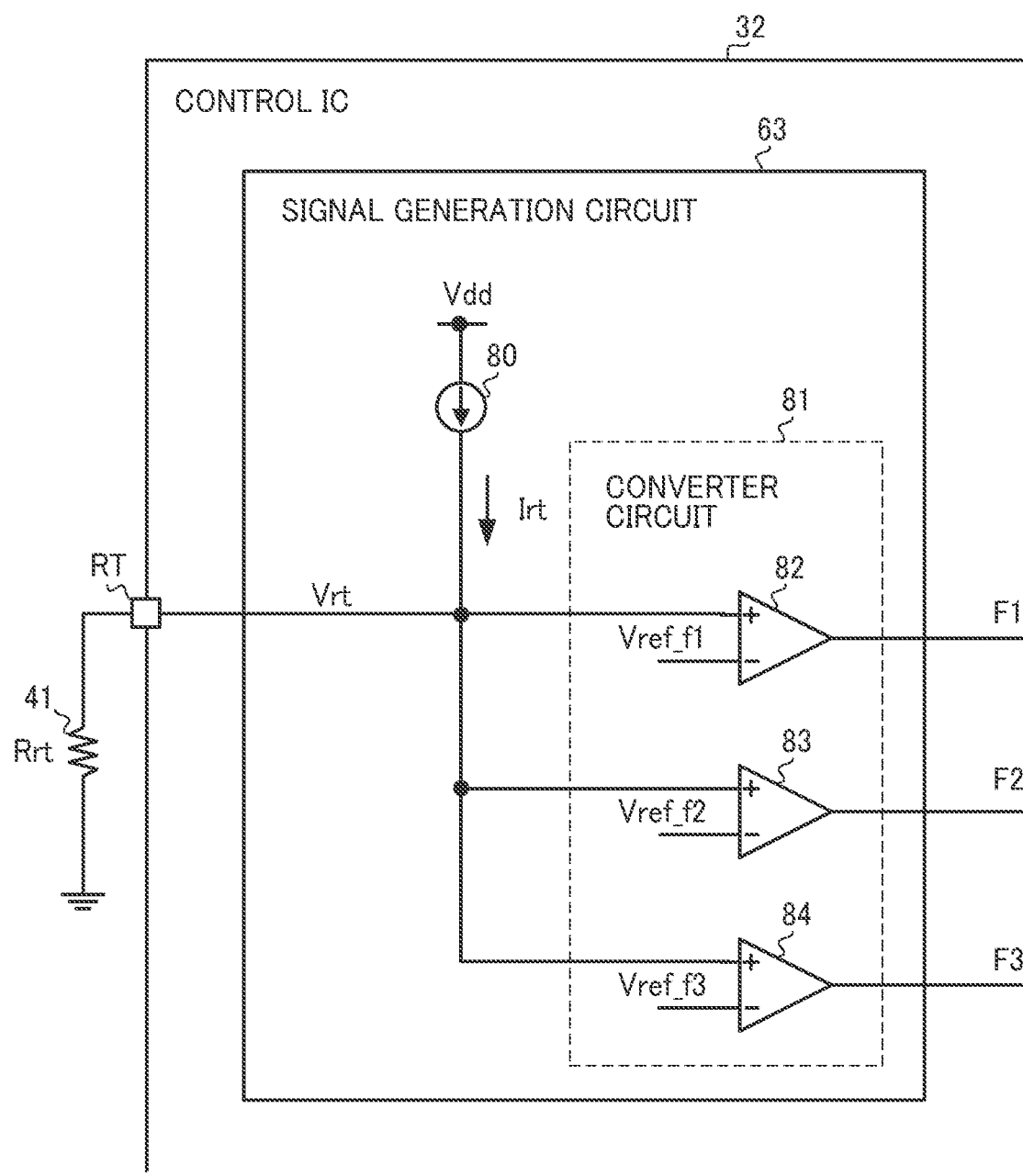
FIG. 4 is a diagram illustrating an example of a configuration of a signal generation circuit 63.

FIG. 4 is a diagram illustrating an example of a configuration of the signal generation circuit 63. The signal generation circuit 63 includes a constant current source 80 and a converter circuit 81. The constant current source 80 supplies a constant current Irt to the resistor 41 through the terminal RT.

The converter circuit 81 converts a voltage Vrt corresponding to the resistance value Rrt of the resistor 41 coupled to the terminal RT into the signals F1 to F3 to set the oscillation frequency Fosc of the oscillator signals Vct and osc_out (described later). The converter circuit 81 serving as an analog-digital converter includes comparators 82 to 84.

The comparators 82 to 84 compare the voltage Vrt generated at the resistor 41 with reference voltages, and output resultant signals as the signals F1 to F3, respectively. Specifically, when the voltage Vrt corresponding to the resistance value Rrt of the resistor 41 is higher than a reference voltage Vref_f1, the comparator 82 outputs the signal F1 at a high level (hereinafter, referred to as high or high level). On the other hand, when the voltage Vrt is lower than the reference voltage Vref_f1, the comparator 82 outputs the signal F1 at a low level (hereinafter, referred to as low or low level).

Likewise, when the voltage Vrt is higher than a reference voltage Vref_f2, the comparator 83 outputs a high signal F2. On the other hand, when the voltage Vrt is lower than the reference voltage Vref_f2, the comparator 83 outputs a low signal F2.

In addition, when the voltage Vrt is higher than a reference voltage Vref_f3, the comparator 84 outputs a high signal F3. On the other hand, when the voltage Vrt is lower than the reference voltage Vref_f3, the comparator 84 outputs a low signal F3. In this case, the reference voltage Vref_f1>the reference voltage Vref_f2>the reference voltage Vref_f3 holds.

As has been described above, when the resistance value Rrt of the resistor 41 reaches any one of resistance values Rrt0 to Rrt3, the signal generation circuit 63 outputs the signals F1 to F3 in accordance with the resistance value Rrt, as illustrated in FIG. 5. Note that the resistance value Rrt corresponds to a "first resistance value".

In this case, the resistance value Rrt is set such that Rrt0>Rrt1>Rrt2>Rrt3 holds, and the voltage Vrt corresponding to the resistance value Rrt is determined such that the signal generation circuit 63 can output the signals F1 to F3 as illustrated in FIG. 5. Note that a relationship between the signals F1 to F3 and the oscillation frequency Fosc will be described later. The signals F1 to F3 correspond to a "digital value".

Comparator 64

Returning to FIG. 3, the comparator 64 will be described. The comparator 64 detects overcurrent flowing through the power transistor 30, using the voltage Vcs generated in accordance with the inductor current IL1, and detects whether the current flowing through the power transistor 30 is overcurrent. Note that, since a coupling point at which the power transistor 30 and the resistor 31 are coupled is grounded, the voltage Vcs results in a negative voltage.

Specifically, in response to the voltage Vcs dropping below a reference voltage Vref_ocp, in other words, when a negative voltage generated at the resistor 31 in accordance with the inductor current IL1 drops below the reference voltage Vref_ocp, the comparator 64 outputs a signal ocp indicating that overcurrent is detected.

On the other hand, when the voltage Vcs is higher than the reference voltage Vref_ocp, the comparator 64 outputs a signal ocp indicating that no overcurrent is detected. Note that, since the voltage Vcs is a negative voltage, the reference voltage Vref_ocp is also a negative voltage.

In FIG. 3, for convenience of explanation, the reference voltage Vref_ocp is a negative voltage. However, the voltage Vcs may be level-shifted to be a positive voltage, and the voltage Vcs that is a positive voltage and the reference voltage Vref_ocp that is a positive voltage may be compared with each other. Note that the comparator 64 corresponds to a "second detection circuit", and the signal ocp corresponds to a "detection result".

Detection Circuit 65

The detection circuit 65 detects whether the load 11 of FIG. 1 is in the overload state. Specifically, when the comparator 64 outputs the signal ocp indicating that overcurrent is detected or when the feedback voltage Vfb exceeds a reference voltage Vtholp_h (described later), the detection circuit 65 outputs a signal olp indicating overload.

On the other hand, when the comparator 64 outputs the signal ocp indicating no overcurrent being detected as well as the feedback voltage Vfb does not exceed the reference voltage Vtholp_h (described later), the detection circuit 65 outputs a signal olp indicating no overload.

Figure 6:
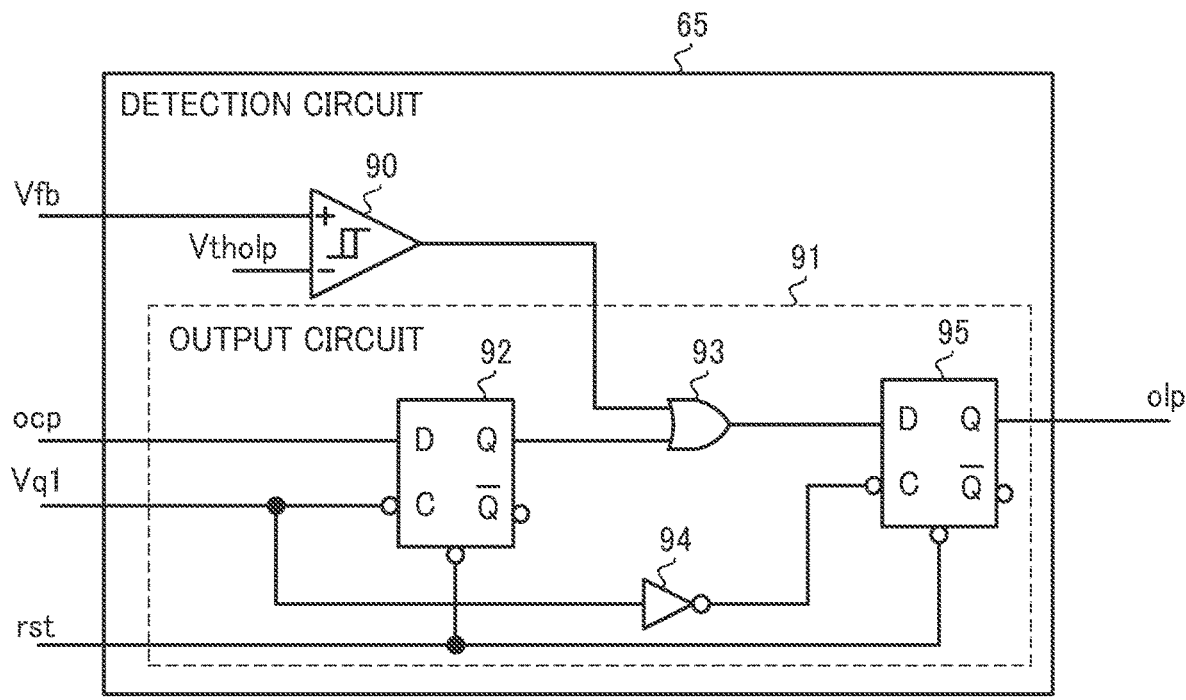
FIG. 6 is a diagram illustrating an example of a configuration of a detection circuit 65.

FIG. 6 is a diagram illustrating an example of a configuration of the detection circuit 65. The detection circuit 65 includes a hysteresis comparator 90 and an output circuit 91.

Hysteresis Comparator 90

The hysteresis comparator 90 detects whether the load 11 is in the overload state, based on the feedback voltage Vfb. Specifically, the hysteresis comparator 90 generates the high reference voltage Vtholp_h and a reference voltage Vtholp_l lower than the reference voltage Vtholp_h from a reference voltage Vtholp. The hysteresis comparator 90 then compares the feedback voltage Vfb with the reference voltage Vtholp_h.

When the feedback voltage Vfb exceeds the reference voltage Vtholp_h, the hysteresis comparator 90 outputs a signal indicating overload. On the other hand, when the feedback voltage Vfb does not exceed the reference voltage Vtholp_h, the hysteresis comparator 90 outputs a signal indicating no overload. When the feedback voltage Vfb is lower than the reference voltage Vtholp_l, the hysteresis comparator 90 outputs the signal indicating no overload. Note that the reference voltage Vtholp_h corresponds to a "third voltage", and the hysteresis comparator 90 corresponds to a "comparator circuit".

Output Circuit 91

The output circuit 91 outputs the signal olp indicating whether the load 11 is in the overload state, based on the comparison result of the hysteresis comparator 90 or the signal ocp. Specifically, in response to the hysteresis comparator 90 outputting the signal indicating overload or the comparator 64 of FIG. 3 outputting the signal ocp indicating overcurrent, the output circuit 91 outputs the signal olp indicating overload. On the other hand, in response to the hysteresis comparator 90 outputting the signal indicating no overload as well as the comparator 64 outputting the signal ocp indicating no overcurrent, the output circuit 91 outputs the signal olp indicating no overload.

The output circuit 91 includes D flip-flops 92 and 95, an OR element 93, and an inverter 94. The D flip-flop 92 detects whether the load 11 is in the overload state, based on whether overcurrent flows through the power transistor 30 of FIG. 1. Specifically, in the case where the comparator 64 outputs the signal ocp indicating overcurrent when the power transistor 30 is turned off (i.e., during falling of the signal Vq1 (described later) of FIG. 3), the D flip-flop 92 outputs a signal indicating overload.

On the other hand, in the case where the comparator 64 outputs the signal ocp indicating that no overcurrent when the power transistor 30 is turned off, the D flip-flop 92 outputs a signal indicating no overload. A description has been given of a case in which the undervoltage lockout circuit 60 of FIG. 3 outputs a high reset signal rst. On the other hand, in response to the undervoltage lockout circuit 60 outputting a low reset signal rst, the D flip-flop 92 is reset so as to output the signal indicating no overload.

The OR element 93 outputs a signal indicating overload, based on the outputs from the hysteresis comparator 90 and the D flip-flop 92. Specifically, when either one of the hysteresis comparator 90 and the D flip-flop 92 outputs the signal indicating overload, the OR element 93 outputs the signal indicating overload.

On the other hand, when both the hysteresis comparator 90 and D flip-flop 92 output the signal indicating no overload, the OR element 93 outputs a signal indicating no overload.

The inverter 94 inverts a logical level of the signal Vq1 and outputs a resultant signal as a clock signal of the D flip-flop 95.

The D flip-flop 95 detects whether it is overload based on the output from the OR element 93. Specifically, in response to the OR element 93 outputting the signal indicating overload when the power transistor 30 is turned on (i.e., during rising of the signal Vq1), the D flip-flop 95 outputs the signal olp indicating overload.

On the other hand, in response to the OR element 93 outputting the signal indicating no overload when the power transistor 30 is turned on, the D flip-flop 95 outputs the signal olp indicating no overload. A description has been given of a case in which the undervoltage lockout circuit 60 of FIG. 3 outputs the high reset signal rst. On the other hand, in response to the undervoltage lockout circuit 60 outputting the low reset signal rst, the D flip-flop 95 is reset so as to output the signal olp indicating no overload. Note that the detection circuit 65 corresponds to a "first detection circuit", the output circuit 91 corresponds to a "second output circuit", and the signal olp corresponds to a "detection result".

Oscillator Circuit 66

Returning to FIG. 3, the oscillator circuit 66 will be described. The oscillator circuit 66 outputs the oscillator signals Vct and osc_out in a cycle corresponding to the resistance value of the resistor 41. Specifically, when the load 11 of FIG. 1 is not in the overload state, the oscillator circuit 66 outputs the oscillator signals Vct and osc_out, based on the resistance value Rrt of the resistor 41 and the feedback voltage Vfb.

On the other hand, when the load 11 is in the overload state, the oscillator circuit 66 outputs the oscillator signals Vct and osc_out based on the resistance value Rrt of the resistor 41 and the voltage Vvf.

Figure 7:
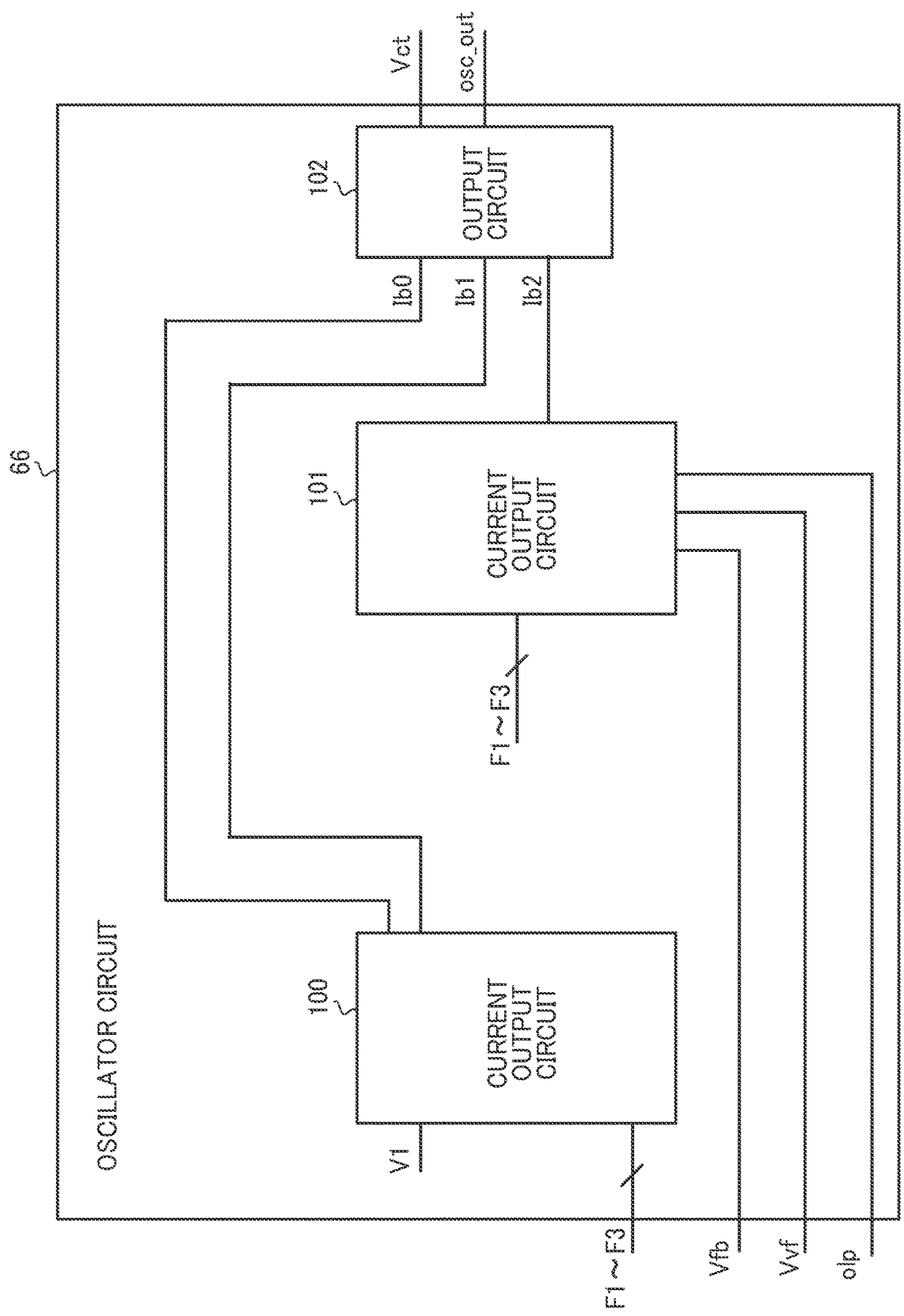
FIG. 7 is a diagram illustrating an example of a configuration of an oscillator circuit 66.

FIG. 7 is a diagram illustrating an example of a configuration of the oscillator circuit 66. The oscillator circuit 66 includes current output circuits 100 and 101 and an output circuit 102. The current output circuit 100 outputs currents Ib0 and Ib1, based on the resistance value Rrt of the resistor 41 and a voltage V1.

Current Output Circuit 100

Figure 8:
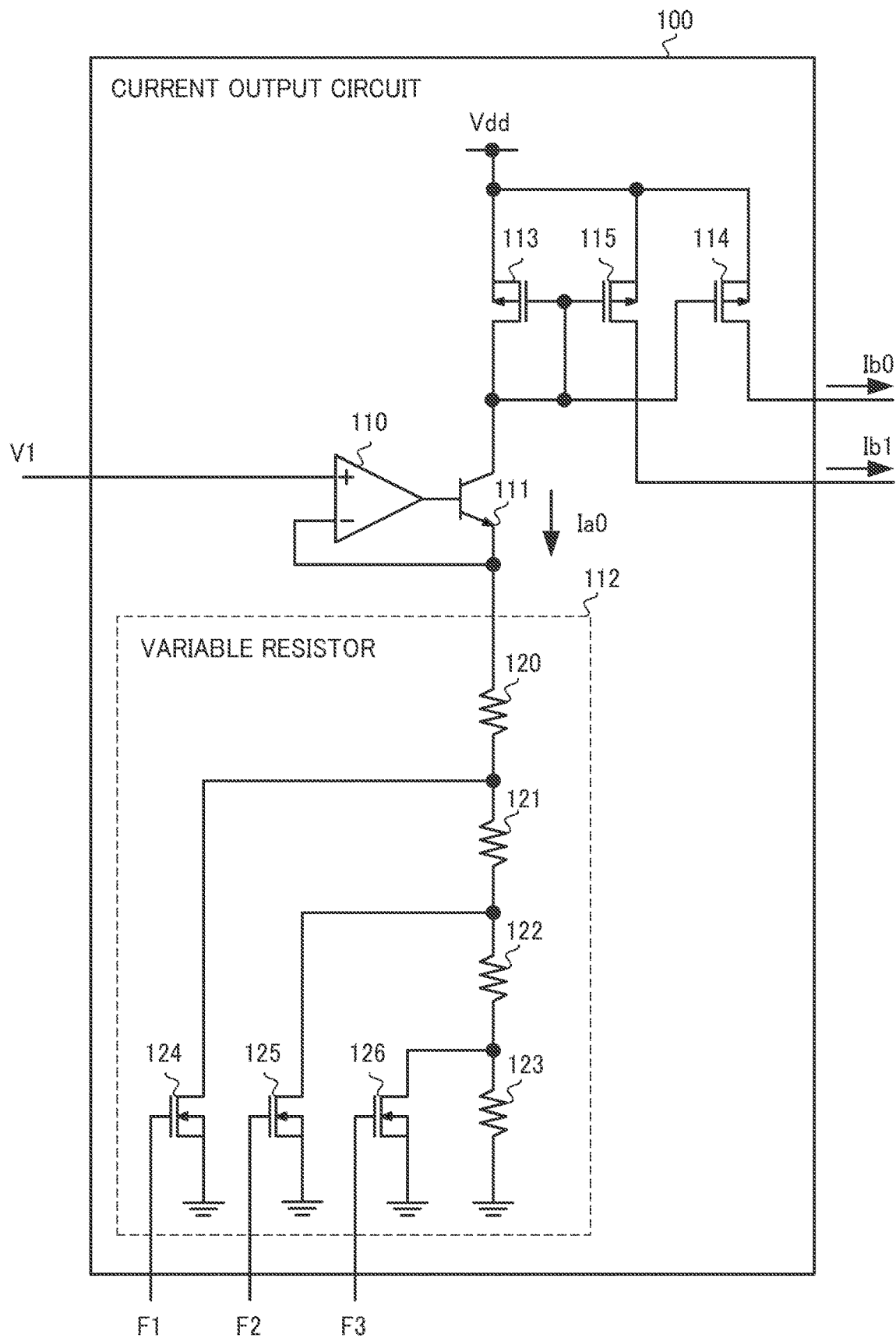
FIG. 8 is a diagram illustrating an example of a configuration of a current output circuit 100.

FIG. 8 is a diagram illustrating an example of a configuration of the current output circuit 100. The current output circuit 100 outputs the currents Ib0 and Ib1 corresponding to the voltage V1, based on the signals F1 to F3 according to the resistance value Rrt of the resistor 41.

The current output circuit 100 includes an operational amplifier 110, an NPN transistor 111, a variable resistor 112, and PMOS transistors 113 to 115.

The operational amplifier 110 has a non-inverting input terminal to receive the voltage V1 and an inverting input terminal to which an emitter terminal of the NPN transistor 111 and one end of the variable resistor 112 are coupled, the variable resistor 112 detecting a current Ia0 flowing through the NPN transistor 111 and the PMOS transistor 113.

The operational amplifier 110 controls the NPN transistor 111 such that a voltage at the inverting input terminal reaches the voltage V1 applied to the non-inverting input terminal.

The variable resistor 112 has a resistance value R1 in response to the signals F1 to F3. The variable resistor 112 includes resistors 120 to 123 and NMOS transistors 124 to 126.

The resistance value R1 of the variable resistor 112 varies in response to the signals F1 to F3 from the signal generation circuit 63 of FIG. 4. Specifically, as illustrated in FIG. 5, the signals F1 to F3 go low sequentially, and the more the number of low signals increases in the signals F1 to F3, the more the resistance value R1 increases in stages. Note that the variable resistor 112 corresponds to a "second resistor", and the resistance value R1 corresponds to a "second resistance value".

With the control of the operational amplifier 110, the voltage V1 is applied to the variable resistor 112, and the current Ia0, which is determined based on the voltage V1 and the resistance value R1 of the variable resistor 112, flows through the diode-coupled PMOS transistor 113.

The PMOS transistor 113 and the PMOS transistor 114 configure a current mirror circuit. Thus, the current Ib0 corresponding to the current Ia0 flowing through the PMOS transistor 113 flows through the PMOS transistor 114.

That is, the PMOS transistors 113 and 114 output the current Ib0, based on the resistance value Rrt of the resistor 41 of FIG. 1. In other words, the PMOS transistors 113 and 114 output the current Ib0 corresponding to the resistance value R1 and the voltage V1. Note that the voltage V1 corresponds to a "first voltage", the current Ib0 corresponds to a "first current", and the PMOS transistors 113 and 114 correspond to a "first current source".

Likewise, the PMOS transistor 113 and the PMOS transistor 115 configure a current mirror circuit. Thus, the current Ib1 corresponding to the current Ia0 flowing through the PMOS transistor 113 flows through the PMOS transistor 115.

In other words, the PMOS transistors 113 and 115 output the current Ib1. Note that the current Ib1 corresponds to a "third current", and the PMOS transistors 113 and 115 correspond to a "third current source".

Note that the transistor size of the PMOS transistor 115 is sufficiently smaller than the transistor size of the PMOS transistor 114, which results in the current Ib1 being sufficiently smaller than the current Ib0.

Since the resistance value R1 of the variable resistor 112 increases more in stages as the number of low signals increases more in the signals F1 to F3, the currents Ia0, Ib0, and Ib1 result in decreasing in stages in response to the signals F1 to F3.

Current Output Circuit 101

Figure 9:
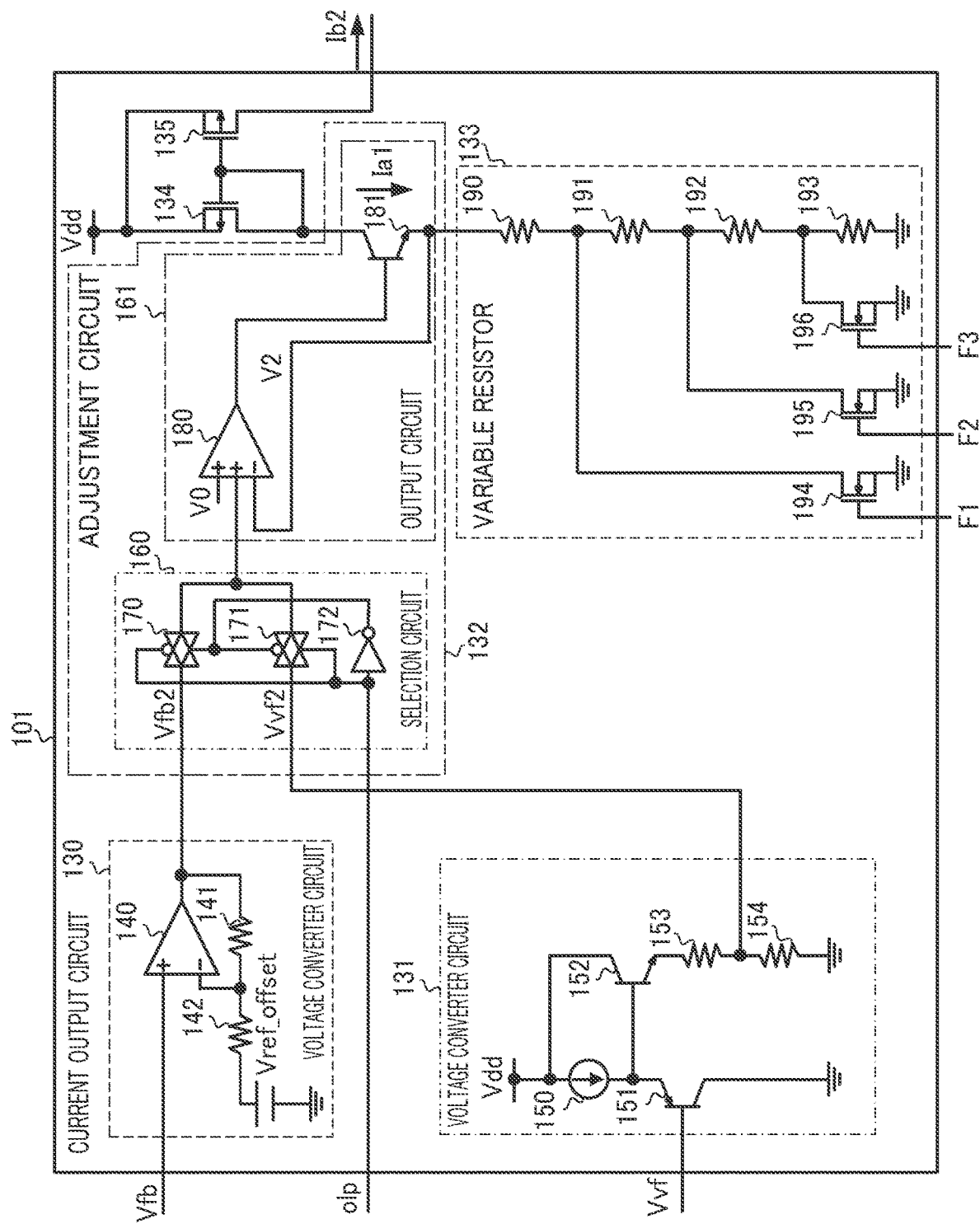
FIG. 9 is a diagram illustrating an example of a configuration of a current output circuit 101.

FIG. 9 is a diagram illustrating an example of a configuration of the current output circuit 101. The current output circuit 101 outputs a current Ib2, based on the signal olp, the feedback voltage Vfb, and the voltage Vvf. Specifically, when the load 11 of FIG. 1 is not in the overload state, the current output circuit 101 outputs the current Ib2, based on the feedback voltage Vfb. On the other hand, when the load 11 is in the overload state, the current output circuit 101 outputs the current Ib2, based on the voltage Vvf.

The current output circuit 101 includes voltage converter circuits 130 and 131, an adjustment circuit 132, a variable resistor 133, and PMOS transistors 134 and 135.

Voltage Converter Circuit 130

The voltage converter circuit 130 converts the feedback voltage Vfb into a voltage Vfb2. Specifically, when the load 11 is in the light load state, the voltage converter circuit 130 converts the level of the feedback voltage Vfb into the level of the voltage Vfb2 such that the level of the voltage Vfb2 becomes equal to the level of a voltage V0 inputted to an operational amplifier 180 (described later).

The voltage converter circuit 130 includes an operational amplifier 140 and resistors 141 and 142.

The operational amplifier 140 has a non-inverting input terminal to receive the feedback voltage Vfb, and an inverting input terminal to receive a voltage at a coupling point at which the resistor 141 and the resistor 142 are coupled, the resistor 141 having one end coupled to an output of the operational amplifier 140, the resistor 142 having one end to receive a voltage Vref_offset.

Then, in response to a drop in the voltage Vfb, the voltage at the coupling point at which the resistors 141 and 142 are coupled drops, which results in a drop in the voltage Vfb2 as well. On the other hand, in response to a rise in the voltage Vfb, the voltage at the coupling point at which the resistors 141 and 142 are coupled rises, which results in a rise in the voltage Vfb2 as well. Note that the voltage converter circuit 130 is designed such that the level of the voltage Vfb2 becomes equal to the level of the voltage V0 inputted to the operational amplifier 180, in response to the load 11 becoming light load state and the voltage Vfb reaching a voltage Vfb2_v0.

Voltage Converter Circuit 131

The voltage converter circuit 131 converts the voltage Vvf into the voltage Vvf2. Specifically, in response to the load 11 becomes light load state, the voltage converter circuit 131 converts the level of the voltage Vvf into the level of the voltage Vvf2 such that the level of the voltage Vvf2 becomes equal to the level of the voltage V0 inputted to the operational amplifier 180.

The voltage converter circuit 131 includes a current source 150, a PNP transistor 151, an NPN transistor 152, and resistors 153 and 154.

The PNP transistor 151 has a base electrode to receive the voltage Vvf, a collector electrode coupled to the current source 150, and an emitter electrode grounded. In response to a drop in the voltage Vvf, a current from the current source 150 flows to the ground through the PNP transistor 151. This results in a drop in a voltage at a coupling point at which the current source 150 and the PNP transistor 151 are coupled.

Then, in response to a drop in the voltage at the coupling point at which the current source 150 and the PNP transistor 151 are coupled, an on-resistance of the NPN transistor 152 rises, and a current flowing through the resistor 153 and the resistor 154, which are coupled in series, decrease. This results in a drop in the voltage Vvf2 generated at a coupling point at which the resistor 153 and the resistor 154 are coupled.

On the other hand, in response to a rise in the voltage Vvf, the voltage Vvf2 rises unlike a case in which the voltage Vvf drops. Note that the voltage converter circuit 131 is designed such that the level of the voltage Vvf2 becomes equal to the level of the voltage V0 inputted to the operational amplifier 180 in response to the load 11 being determined as being in the overload state and the voltage Vvf reaching a voltage Vvf2_v0.

Adjustment Circuit 132

The adjustment circuit 132 adjusts a current value of the current Ib2. Specifically, in response to the load 11 of FIG. 1 becoming overload state, the adjustment circuit 132 adjusts the current Ib2 by adjusting the level of a voltage V2 such that the current Ib2 decreases, based on the voltage Vvf. On the other hand, in response to a rise in the output voltage Vout when the load 11 is not in the heavy load state, the adjustment circuit 132 adjusts the current Ib2 by adjusting the level of the voltage V2 such that the current Ib2 decreases, based on the feedback voltage Vfb.

Selection Circuit 160

The adjustment circuit 132 includes a selection circuit 160 and an output circuit 161. When the load 11 is not in the overload state, the selection circuit 160 selects the voltage Vfb2, and when the load 11 is in the overload state, the selection circuit 160 selects the voltage Vvf2. The selection circuit 160 includes analog switches 170 and 171 and an inverter 172.

In response to the detection circuit 65 outputting the signal olp indicating no overload, the analog switch 170 outputs the voltage Vfb2 to the operational amplifier 180. On the other hand, in response to the detection circuit 65 outputting the signal olp indicating overload, the analog switch 170 does not output the voltage Vfb2 to the operational amplifier 180.

In addition, in response to the detection circuit 65 outputting the signal olp indicating no overload, the analog switch 171 does not output the voltage Vvf2 to the operational amplifier 180. On the other hand, in response to the detection circuit 65 outputting the signal olp indicating overload, the analog switch 171 outputs the voltage Vvf2 to the operational amplifier 180.

The inverter 172 inverts a logical level of the signal olp and outputs a resultant signal to the analog switches 170 and 171.

Output Circuit 161

The output circuit 161 outputs the voltage V2, based on the voltage selected by the selection circuit 160. Specifically, the output circuit 161 outputs, as the voltage V2, a voltage to reduce the current Ib2 out of the voltage V0 and the voltage selected by the selection circuit 160.

The output circuit 161 includes the operational amplifier 180 and an NPN transistor 181. The operational amplifier 180 causes a voltage at a coupling point at which the NPN transistor 181 and the variable resistor 133 are coupled to be the voltage V2, based on the voltage V0 and the voltage selected by the selection circuit 160.

The operational amplifier 180 has a first non-inverting input terminal to receive the voltage V0, a second non-inverting input terminal to receive the voltage selected by the selection circuit 160, and an inverting input terminal to receive the voltage (i.e., the voltage V2) at the coupling point at which the NPN transistor 181 and the variable resistor 133 are coupled.

The operational amplifier 180 causes the voltage V2 of the inverting input terminal to reach the voltage applied to the non-inverting input terminal. Thus, a current Ia1 based on the voltage V2 and a resistance value of the variable resistor 133 (described later) flows through the NPN transistor 181.

The current output circuit 101 outputs the current Ib2, based on a lower voltage out of the voltage V0 and the voltage selected by the selection circuit 160. Note that the output circuit 161 corresponds to a "third output circuit", and the voltage V0 corresponds to a "predetermined voltage".

Variable Resistor 133

The variable resistor 133 has a resistance value R2 in response to the signals F1 to F3. The variable resistor 133 includes resistors 190 to 193 and NMOS transistors 194 to 196.

The resistance value R2 of the variable resistor 133 varies similarly to the variable resistor 112, in response to the signals F1 to F3 from the signal generation circuit 63 of FIG. 4. Specifically, the current Ib2 is determined as described later, and thus the currents Ia1 and Ib2 decrease in stages as the resistance value R2 increases in stages in response to the signals F1 to F3.

Note that variable resistors 112 and 133 are designed such that the resistance value R1 of the variable resistor 112 is smaller than the resistance value R2 of the variable resistor 133 when the voltage V1 applied to the current output circuit 100 is equal to the voltage V0 used in the current output circuit 101. The resistance value R2 corresponds to a "third resistance value", and the variable resistor 133 corresponds to a "third resistor".

PMOS Transistors 134 and 135

The PMOS transistors 134 and 135 configure a current mirror circuit. Thus, the current Ib2 corresponding to the current Ia1 flowing through the PMOS transistor 134 flows through the PMOS transistor 135.

That is, the PMOS transistors 134 and 135 output the current Ib2 smaller than the current Ib0, based on the resistance value Rrt of the resistor 41 of FIG. 1. In other words, the PMOS transistors 134 and 135 output the current Ib2 corresponding to the resistance value R2 and the voltage V2. Note that the voltage V2 corresponds to a "second voltage", the current Ib2 corresponds to a "second current", and the PMOS transistors 134 and 135 correspond to a "second current source".

Output Circuit 102

The output circuit 102 outputs the oscillator signals Vct and osc_out, based on the currents Ib0 to Ib2. Specifically, the output circuit 102 outputs the oscillator signals Vct and osc_out having an on period corresponding to a current value of the current Ib0 and an off period corresponding to a current value of the current Ib2.

Figure 10:
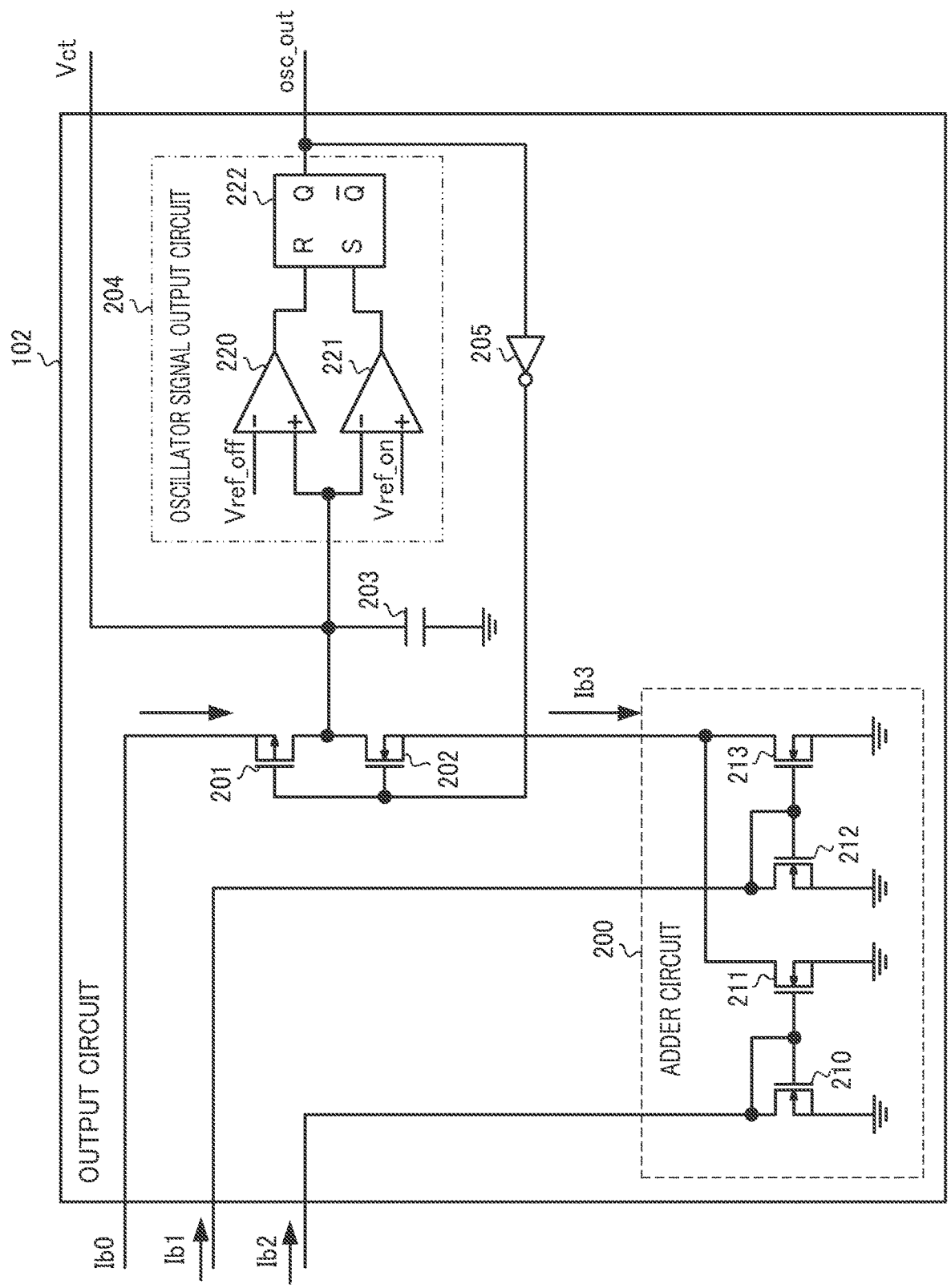
FIG. 10 is a diagram illustrating an example of a configuration of an output circuit 102.

FIG. 10 is a diagram illustrating an example of a configuration of the output circuit 102. The output circuit 102 includes an adder circuit 200, a PMOS transistor 201, an NMOS transistor 202, a capacitor 203, an oscillator signal output circuit 204, and an inverter 205.

Adder Circuit 200

The adder circuit 200 adds the current Ib1 and the current Ib2 to obtain a current Ib3. Specifically, when the load 11 of FIG. 1 is in the light load state or the overload state, the adder circuit 200 adds the current Ib2 outputted based on the dropping feedback voltage Vfb or voltage Vvf to the current Ib1 outputted based on the voltage V1.

The adder circuit 200 includes NMOS transistors 210 to 213. The NMOS transistor 210 and the NMOS transistor 211 configure a current mirror circuit. Thus, a current corresponding to the current Ib2 flowing through the NMOS transistor 210 flows through the NMOS transistor 211.

In addition, the NMOS transistor 212 and the NMOS transistor 213 configure a current mirror circuit. Thus, a current corresponding to the current Ib1 flowing through the NMOS transistor 212 flows through the NMOS transistor 213.

At a node at which a drain electrode of the NMOS transistor 211 and a drain electrode of the NMOS transistor 213 are coupled to each other, the current corresponding to the current Ib1 and the current corresponding to the current Ib2 are added, to thereby obtain the current Ib3. Note that the current Ib3 corresponds to a "fourth current".

PMOS Transistor 201 and NMOS Transistor 202

The PMOS transistor 201 and the NMOS transistor 202 control charging and discharging of the capacitor 203. Specifically, while the oscillator signal osc_out to determine the on period of the power transistor 30 of FIG. 1 is outputted, the PMOS transistor 201 is on. Then, with the current Ib0 flowing through the PMOS transistor 201, the capacitor 203 is charged.

On the other hand, while the oscillator signal osc_out to determine the off period of the power transistor 30 is outputted, the NMOS transistor 202 is on. Then, with the current Ib3 flowing through the NMOS transistor 202, the capacitor 203 is discharged.

Capacitor 203

The capacitor 203 is charged with the current Ib0 during the on period determined by the oscillator signal osc_out, and is discharged with the current Ib3 during the off period determined by the oscillator signal osc_out. Then, the voltage Vct is generated at the capacitor 203.

Oscillator Signal Output Circuit 204

The oscillator signal output circuit 204 outputs the oscillator signal osc_out, based on the voltage Vct generated at the capacitor 203. Specifically, in response to the voltage Vct reaching a voltage Vref_on, the oscillator signal output circuit 204 outputs the oscillator signal osc_out to determine the on period of the power transistor 30. On the other hand, in response to the voltage Vct reaching a voltage Vref_off, the oscillator signal output circuit 204 outputs the oscillator signal osc_out to determine the off period of the power transistor 30. Note that the voltage Vref_off is lower than the voltage Vtholp_h.

The oscillator signal output circuit 204 includes comparators 220 and 221 and an SR flip-flop 222. When the voltage Vct reaching the voltage Vref_off, the comparator 220 outputs a high signal. On the other hand, when the voltage Vct is lower than the voltage Vref_off, the comparator 220 outputs a low signal.

In response to the voltage Vct reaching the voltage Vref_on, the comparator 221 outputs a high signal. On the other hand, when the voltage Vct is higher than the voltage Vref_on, the comparator 221 outputs a low signal.

The SR flip-flop 222 outputs the oscillator signal osc_out. Specifically, when the comparator 220 outputs the high signal, the SR flip-flop 222 outputs a low oscillator signal osc_out to determine the off period of the power transistor 30.

On the other hand, in response to the comparator 221 outputting the high signal, the SR flip-flop 222 outputs a high oscillator signal osc_out to determine the on period of the power transistor 30.

The inverter 205 controls the PMOS transistor 201 and the NMOS transistor 202. Specifically, in response to the oscillator signal output circuit 204 outputting the high oscillator signal osc_out, the inverter 205 turns on the PMOS transistor 201.

On the other hand, in response to the oscillator signal output circuit 204 outputting the low oscillator signal osc_out, the inverter 205 turns on the NMOS transistor 202.

FIG. 11 is a diagram illustrating a relationship between the signals F1 to F3 and the oscillation frequency Fosc. As illustrated in FIG. 5, in response to the resistance value Rrt of the resistor 41 of FIG. 1 being set, the signal generation circuit 63 outputs the signals F1 to F3 in accordance with the resistance value Rrt.

The current output circuit 100 outputs the currents Ib0 and Ib1 that decrease smaller in stages as the number of low signals increases more in the signals F1 to F3. Likewise, the current output circuit 101 outputs the current Ib2 that decreases smaller in stages as the number of low signals increases more in the signals F1 to F3. As a result, the adder circuit 200 outputs the current Ib3 that decreases smaller in stages as the number of low signals increases more in the signals F1 to F3.

Accordingly, since the currents Ib0 and Ib3 to charge and discharge the capacitor 203 decrease smaller as the number of low signals increases more in the signals F1 to F3, the cycle of the voltage Vct increases more as the number of low signals increases more in the signals F1 to F3. Thus, as illustrated in FIG. 11, the oscillation frequency Fosc decreases smaller in stages as the number of low signals increases more in the signals F1 to F3.

As described above, the oscillation frequency Fosc is determined based on the signals F1 to F3; however, the current Ib2 is determined not only based on the signals F1 to F3 but also in accordance with the feedback voltage Vfb or the voltage Vvf depending on whether the load 11 of FIG. 1 is in the overload state.

In addition, in the forward AC-DC converter 10, the remanent magnetism of the transformer 22 needs to be eliminated during a period of time during which the power transistor 30 is off. Thus, the maximum on-duty of the power transistor 30 is determined. In order to comply with the maximum on-duty, the current output circuits 100 and 101 are designed such that the current Ib0 is larger than the currents Ib2 and Ib3. Note that the output circuit 102 corresponds to a "first output circuit".

Figure 12:
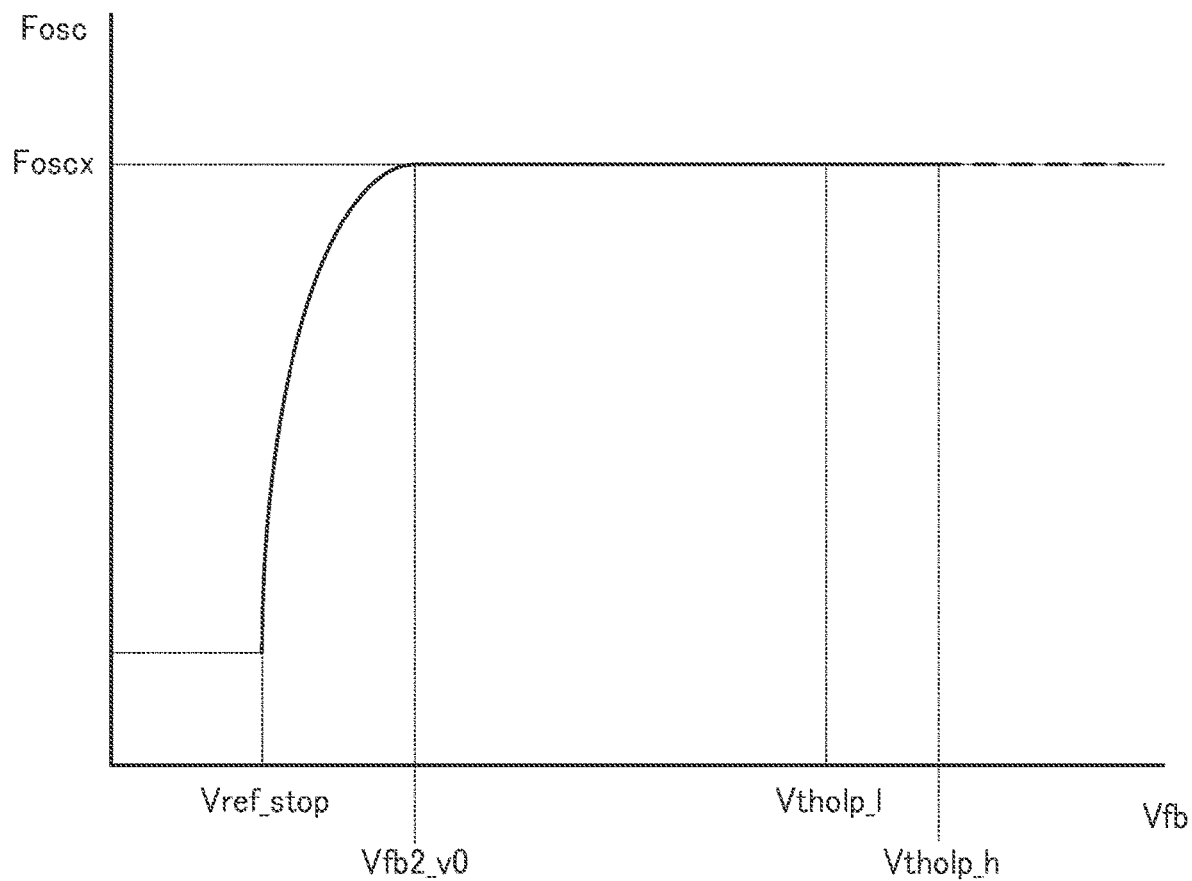
FIG. 12 is a diagram illustrating a relationship between a feedback voltage Vfb and an oscillation frequency Fosc.

FIG. 12 is a diagram illustrating a relationship between the feedback voltage Vfb and the oscillation frequency Fosc. When the load 11 is not in the overload state, the selection circuit 160 of FIG. 9 selects the voltage Vfb2, and the current output circuit 101 outputs the current Ib2 in accordance with the voltage Vfb2.

In this case, as the load 11 is becoming lighter state, the feedback voltage Vfb is dropping. Then, in response to the feedback voltage Vfb dropping to the voltage Vfb2_v0 such that the voltage Vfb2 drops below the voltage V0, as illustrated in FIG. 12, the operational amplifier 180 of FIG. 9 is adjusted so as to lower the voltage V2 based on the voltage Vfb2. Thus, the current output circuit 101 outputs the current Ib2 that decreases in accordance with the voltage Vfb2, and the oscillation frequency Fosc of the oscillator circuit 66 gradually decreases from an oscillation frequency Foscx. Note that the oscillation frequency Foscx is determined in accordance with the resistance value Rrt of the resistor 41 (i.e., Rrt0 to Rrt3). In this case, "x" represents "0 to 3" according to Rrt0 to Rrt3, respectively.

Note that, when the feedback voltage Vfb drops below the voltage Vref_stop, the comparator 68 of FIG. 3 outputs a signal stop0 to stop switching the power transistor 30 in FIG. 1, which will be described later in detail. Thus, when the feedback voltage Vfb drops below the voltage Vref_stop, the switching of the power transistor 30 is stopped.

Figure 13:
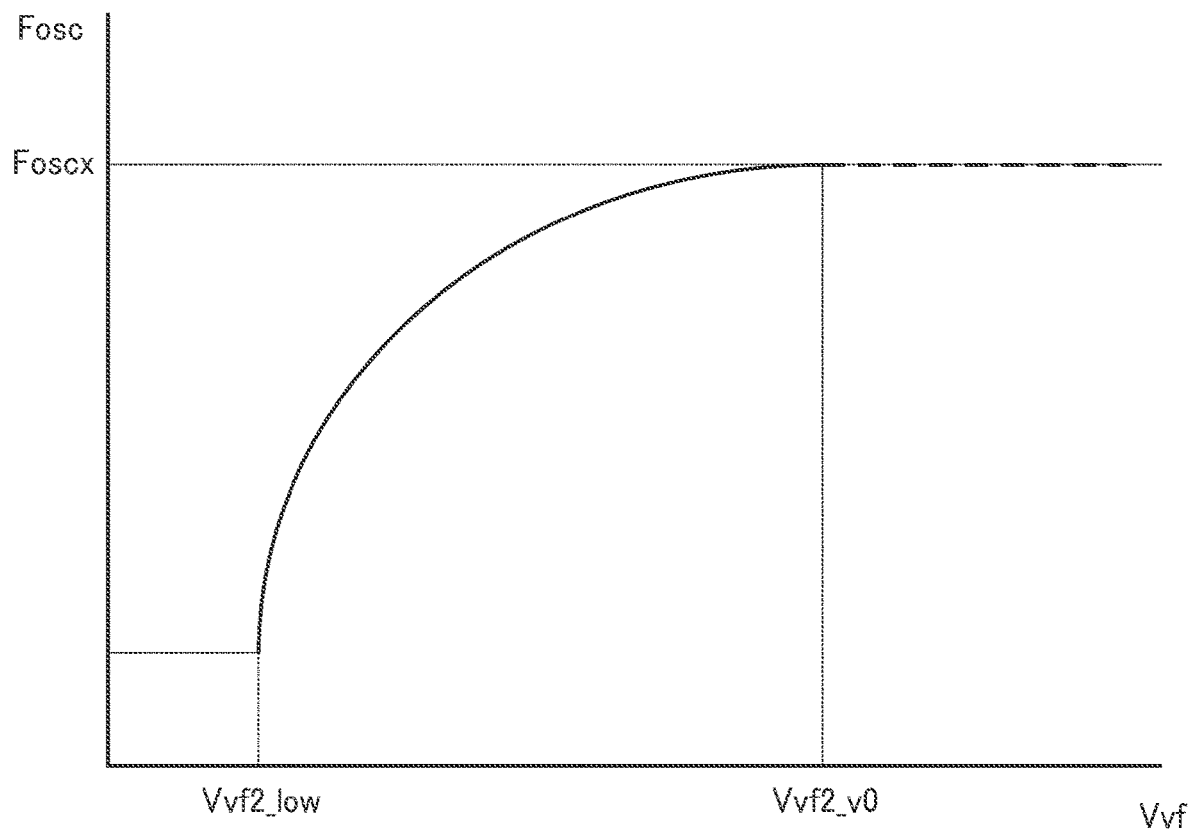
FIG. 13 is a diagram illustrating a relationship between a voltage Vvf and an oscillation frequency Fosc.

FIG. 13 is a diagram illustrating a relationship between the voltage Vvf and the oscillation frequency Fosc. When the load 11 is in the overload state, the selection circuit 160 selects the voltage Vvf2, and the current output circuit 101 outputs the current Ib2 in accordance with the voltage Vvf2.

In this case, more power is supplied to the secondary side of the transformer 22 of FIG. 1 since the load 11 is the overload state, and thus the inductor current IL1 flowing through the power transistor 30 flows containing more DC offset components, which will be described later in detail.

Note that the "DC offset components" indicate a current value of the inductor current IL1 that flows at the moment at which the power transistor 30 is turned on. The current value of the inductor current IL1 when the power transistor 30 is on is a current value obtained by adding, to the DC offset components, the current value of the current that increases over time in accordance with an inductance value of the primary coil L1 and the rectified voltage Vrec1.

Thus, in response to the load 11 becoming overload state, the period of time from when the power transistor 30 is turned on to when the comparator 64 in FIG. 3 detects overcurrent decreases. Accordingly, when the load 11 is in the overload state, the period of time during which the power transistor 30 is on decreases.

Since the voltage Vvf is a voltage corresponding to the period of time during which the power transistor 30 is on, the voltage Vvf gradually decreases when the load 11 is in the overload state. Then, in response to the voltage Vvf decreasing to the voltage Vvf2_v0 as illustrated in FIG. 13, the voltage Vvf2 drops below the voltage V0, and the operational amplifier 180 of FIG. 9 adjusts such that the voltage V2 is lowered based on the voltage Vvf2. Thus, the current output circuit 101 outputs the current Ib2 that decreases in accordance with the voltage Vvf2, and the oscillation frequency Fosc of the oscillator circuit 66 gradually decreases from the oscillation frequency Foscx. In response to the voltage Vvf reaching the voltage Vvf2_low, the comparator 300 outputs a signal stop1 to stop switching the power transistor 30, which will be described later in detail. Accordingly, when the feedback voltage Vvf drops below the voltage Vvf2_low, the switching of the power transistor 30 is stopped.

Driving Signal Output Circuit 67

Returning to FIG. 3, the driving signal output circuit 67 will be described. The driving signal output circuit 67 outputs the driving signal Vq1 to turn on the power transistor 30 based on the oscillator signal osc_out and to turn off the power transistor 30 based on the feedback voltage Vfb.

Further, in response to the inductor current IL1 flowing through the power transistor 30 reaching overcurrent and the comparator 64 outputting the signal ocp indicating overcurrent, the driving signal output circuit 67 outputs the driving signal Vq1 to turn off the power transistor 30.

The driving signal output circuit 67 includes a comparator 70, a one-shot circuit 71, SR flip-flops 72 and 73, and an AND element 74.

In response to the oscillator circuit 66 outputting the high oscillator signal osc_out, the power transistor 30 is turned on, which will be described later in detail. Then, in response to the oscillator signal Vct reaching the feedback voltage Vfb, the comparator 70 outputs a signal Vr to turn off the power transistor 30.

In addition, in response to the high oscillator signal osc_out, the one-shot circuit 71 outputs a pulse signal Vp1.

The pulse signal Vp1 is inputted to a set terminal of the SR flip-flop 72 and a reset terminal of the SR flip-flop 73.

Thus, upon receiving the pulse signal Vp1 from the one-shot circuit 71, the SR flip-flop 72 and the SR flip-flop 73 output signals to turn on the power transistor 30 from a Q output thereof and a Q-bar output thereof, respectively.

In addition, the signal Vr from the comparator 70 is inputted to a reset terminal of the SR flip-flop 72, and the signal ocp from the comparator 64 is inputted to a set terminal of the SR flip-flop 73.

Upon receiving the signal Vr to turn off the power transistor 30 from the comparator 70, the SR flip-flop 72 outputs a signal to turn off the power transistor 30 from the Q output thereof. In addition, upon receiving the signal ocp indicating overcurrent outputted from the comparator 64, the SR flip-flop 73 outputs a signal to turn off the power transistor 30 from the Q-bar output thereof.

Based on the oscillator signal osc_out from the oscillator circuit 66, the Q output of the SR flip-flop 72, and the Q-bar output of the SR flip-flop 73, the AND element 74 outputs the driving signal Vq1. Specifically, upon receiving the signal to turn on the power transistor 30 from the Q output of the SR flip-flop 72 and the Q-bar output of the SR flip-flop 73 while receiving the high oscillator signal osc_out, the AND element 74 outputs a high driving signal Vq1 to turn on the power transistor 30.

On the other hand, upon receiving the signal Vr to turn off the power transistor 30 from the comparator 70 while the receiving the high oscillator signal osc_out, the AND element 74 outputs a low driving signal Vq1 to turn off the power transistor 30. Likewise, upon receiving the signal ocp indicating overcurrent from the comparator 64, the AND element 74 outputs the low driving signal Vq1 to turn off the power transistor 30.

Note that a description has been given of a case of receiving the high oscillator signal osc_out, however, upon receiving the low oscillator signal osc_out, the AND element 74 outputs the low driving signal Vq1 to turn off the power transistor 30. Accordingly, the oscillator signal osc_out functions as a signal to determine the maximum on width of the power transistor 30. In other words, in response to the feedback voltage Vfb rising to the voltage Vref_off, the on width of the power transistor 30 reaches the maximum on width. Then, when the feedback voltage Vfb further rises and exceeds the voltage Vtholp_h, the detection circuit 65 outputs the signal olp indicating overload.

Comparator 68

In response to the load 11 of FIG. 1 becoming light load state and the feedback voltage Vfb dropping to the predetermined level, the comparator 68 stops switching the power transistor 30. Specifically, in response to the feedback voltage Vfb dropping to the voltage Vref_stop, the comparator 68 outputs the signal stop0 to stop switching the power transistor 30. On the other hand, in response to the feedback voltage Vfb being higher than the voltage Vref_stop, the comparator 68 outputs the signal stop0 to switch the power transistor 30.

Comparator 300

In response to the load 11 becoming the overload state and the feedback voltage Vvf decreases to the predetermined level, the comparator 300 stops switching the power transistor 30. Specifically, in response to the voltage Vvf dropping to the voltage Vvf2_low, the comparator 300 outputs the signal stop1 to stop switching the power transistor 30. On the other hand, in response to the voltage Vvf being higher than the voltage Vvf2_low, the comparator 300 outputs the signal stop1 to switch the power transistor 30.

Buffer 69

The buffer 69 outputs the driving voltage Vg in response to the driving signal Vq1. Specifically, in response to the driving signal Vq1 to turn on the power transistor 30, the buffer 69 changes the level of the driving voltage Vg to a level of the power supply voltage Vcc.

On the other hand, in response to the driving signal Vq1 to turn off the power transistor 30, the buffer 69 changes the level of the driving voltage Vg to the ground voltage. Upon receiving the signal stop0 to stop switching the power transistor 30 from the comparator 68, the buffer 69 changes the level of the driving voltage Vg to the ground voltage. Likewise, upon receiving the signal stop1 to stop switching the power transistor 30 from the comparator 300, the buffer 69 changes the level of the driving voltage Vg to the ground voltage.

Operations of AC-DC Converter 10 When Load 11 is in Rated Load State

Figure 14:
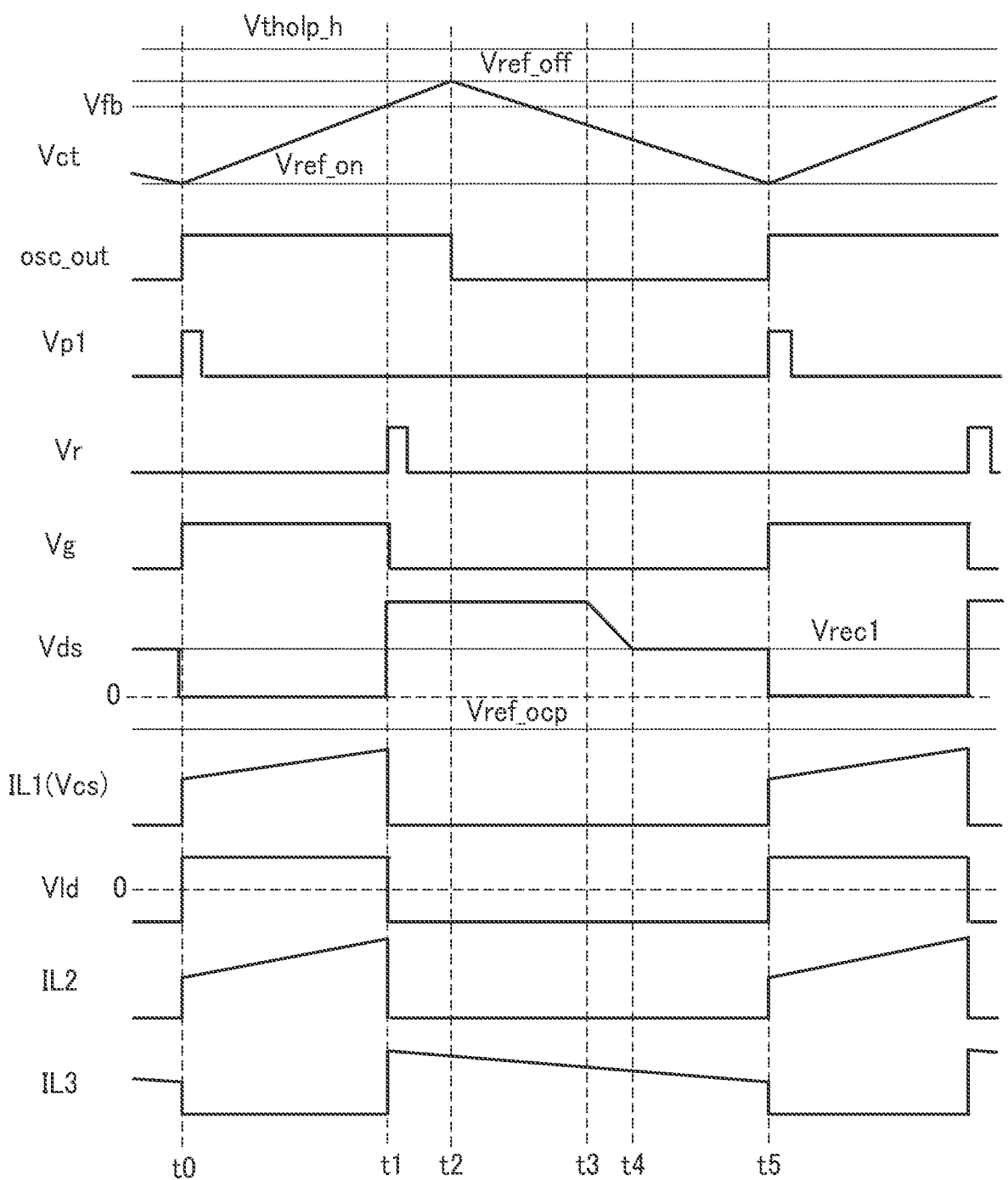
FIG. 14 is a diagram illustrating an example of an operation of a control IC 32 when a load 11 is in a rated load state.

FIG. 14 is a diagram illustrating an example of an operation of the control IC 32 when the load 11 is in the rated load state. Note that, although the voltage Vcs, which is generated at the terminal CS with the inductor current IL1, is a negative voltage, the voltage Vcs in FIG. 14 is given as a positive voltage together with and similarly to the inductor current IL1. The phrase "the load 11 is in the rated load state" indicates that the load 11 is in a state in which the AC-DC converter 10 operates effectively in terms of design.

At time t0 at which the oscillator signal Vct reaches the voltage Vref_on, the oscillator circuit 66 outputs the high oscillator signal osc_out. Thus, the one-shot circuit 71 outputs the pulse signal Vp1, resulting in the buffer 69 changing the level of the driving voltage Vg to the level of the power supply voltage Vcc.

In response to the level of the driving voltage Vg changing to the level of the power supply voltage Vcc, the power transistor 30 is turned on, and the voltage Vds reaches the ground voltage. Then, the inductor current IL1 starts to flow through the primary coil L1. In response to the inductor current IL1 starting to flow therethrough, the diode 50 is turned on and the inductor current IL2 starts to flow, since the primary coil and the secondary coil have the same winding direction. Meanwhile, the diode 51 is off, and the inductor current IL3 does not flow. In this case, a voltage Vld at the coil Ld is a positive voltage.

At time t1 at which the voltage Vct reaches the feedback voltage Vfb, the comparator 70 outputs the signal Vr to turn off the power transistor 30. Thus, the buffer 69 changes the level of the driving voltage Vg to the ground voltage.

In response to the level of the driving voltage Vg changing to the level of the ground voltage, the power transistor 30 is turned off, and the voltage Vds rises. In this case, an electromotive force is generated at the primary coil L1 in a direction opposite to the direction when the power transistor 30 is on. Thus, a current flows from the primary coil L1 to the reset winding L3 through the capacitor 21 and the diode 23. Accordingly, the voltage Vds results in a voltage obtained by combining the voltages generated at the primary coil L1 and the reset winding L3.

With the power transistor 30 being turned off, the inductor current IL1 decreases. Likewise, the diode 50 is turned off, and the inductor current IL2 decreases. On the other hand, the diode 51 is turned on, and the inductor current IL3 starts to flow. In this case, the voltage Vld at the coil Ld is a negative voltage.

At time t2 at which the voltage Vct reaches the voltage Vref_off, the oscillator circuit 66 outputs the low oscillator signal osc_out.

At time t3 at which the current flowing from the primary coil L1 to the reset winding L3 through the capacitor 21 and the diode 23 decreases, the voltage Vds starts to drop.

Then, at time t4 at which the current flowing from the primary coil L1 to the reset winding L3 through the capacitor 21 and the diode 23 ceases, the voltage Vds reaches the rectified voltage Vrec1.

Additionally, at time t5 at which the oscillator signal Vct reaches the voltage Vref_on, the oscillator circuit 66 outputs the high oscillator signal osc_out. Note that, from the time t5, the operation from the time t0 to the time t4 is repeated.

Operation of AC-DC Converter 10 When Load 11 is in Light Load State

Figure 15:
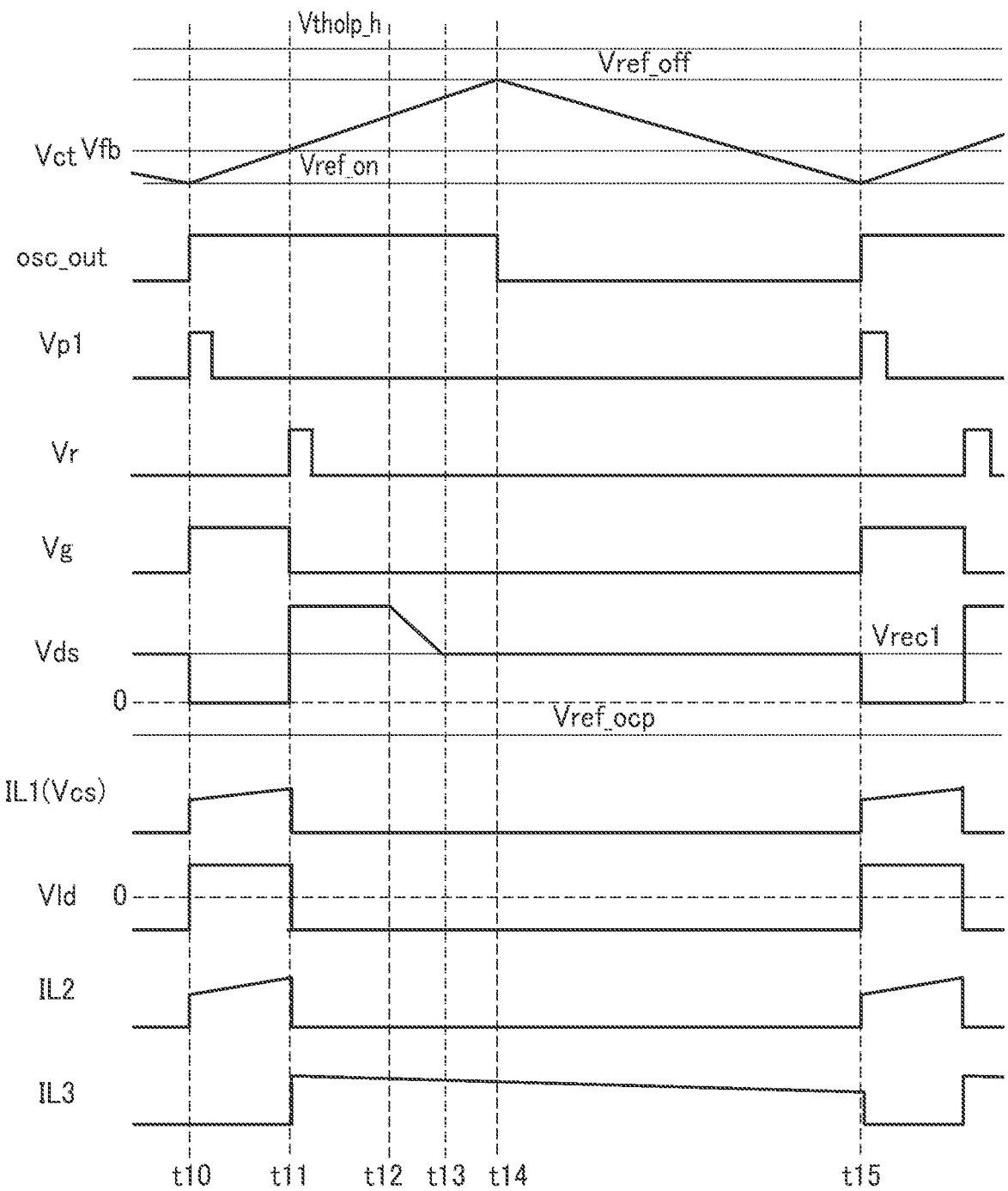
FIG. 15 is a diagram illustrating an example of an operation of a control IC 32 when a load 11 is a light load state.

FIG. 15 is a diagram illustrating an example of an operation of the control IC 32 when the load 11 is in the light load state. Note that, similarly to FIG. 14, the voltage Vcs in FIG. 15 is given as a positive voltage together with and similarly to the inductor current IL1.

Times t10 and t15 correspond to the times t0 and t5, respectively, and time t11 corresponds to the time t1. Times t12 and t13 correspond to the times t3 and t4, respectively, and time t14 corresponds to the time t2.

The feedback voltage Vfb drops lower than that in the case where the load 11 is in the rated load state, which results in the on period of the power transistor 30 decreasing. In addition, since the power supplied to the secondary side of the transformer 22 decreases, the output voltage Vout drops.

Note that the AC-DC converter 10 is a forward power supply circuit, and the inductance value of the transformer 22 is large, and thus, even if the load 11 becomes light load state, the AC-DC converter 10 operates in a continuous current mode.

However, the DC offset components of the inductor current IL1 when the power transistor 30 is turned on in the case where the load 11 is in the light load state are less than that in the case where the load 11 is in the rated load state.

On Period of Power Transistor 30 When Load 11 is in Overload State

Figure 16:
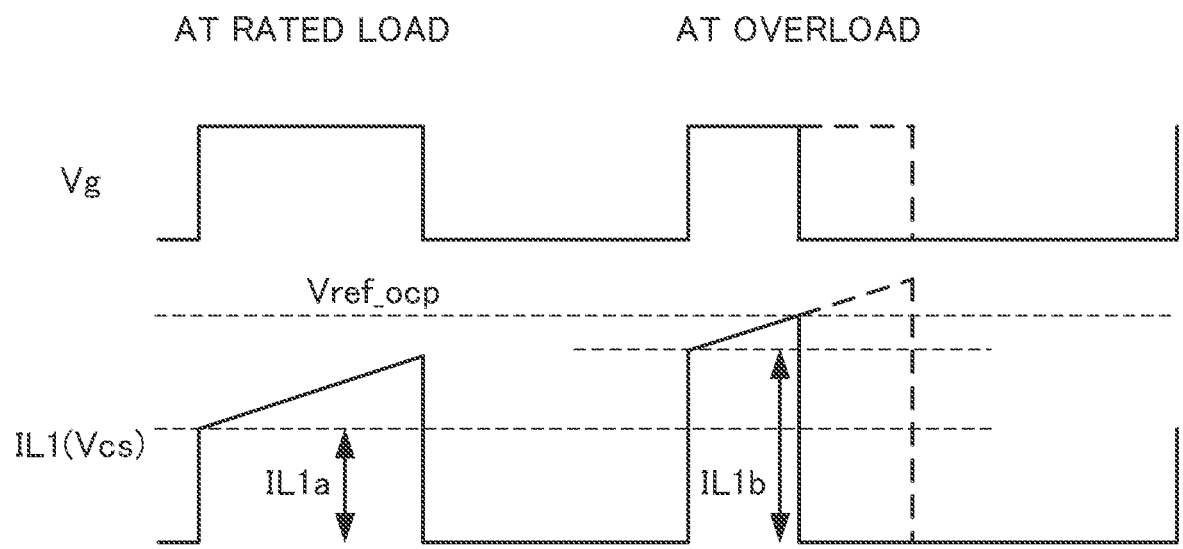
FIG. 16 is a diagram illustrating a relationship between a driving voltage Vg and an inductor current IL1 when a load 11 is in a rated load state or overload state.

FIG. 16 is a diagram illustrating a relationship between the driving voltage Vg and the inductor current IL1 when the load 11 is in the rated load state or the overload state. Note that, similarly to FIGS. 14 and 15, the voltage Vcs in FIG. 16 is given as a positive voltage together with and similarly to the inductor current IL1.

As illustrated in FIG. 16, when the load 11 is in the overload state, generally, more power needs to be supplied to the secondary side of the transformer 22 in order to maintain the output voltage Vout. Thus, in the case where the load 11 is in the overload state, DC offset components IL1$b$ of the inductor current IL1 when the power transistor 30 is turned on increase larger than the DC offset components IL1$a$ in the case where the load 11 is in the rated load state.

Accordingly, the AC-DC converter 10 usually maintains the output voltage Vout at a target level. However, the control IC 32 according to an embodiment of the present disclosure controls the AC-DC converter 10 so as to reduce the output voltage Vout, in response to the load 11 becoming overload state.

Further, upon turning on of the power transistor 30, the inductor current IL1 increases from the increased DC offset components IL1$b$ with a slope corresponding to the inductance value of the primary coil L1 and the rectified voltage Vrec1. Note that this slope is substantially similar, in any state of the load 11.

Thus, even when the voltage Vcs does not reach the voltage Vrec_ocp in the case where the load 11 is in the rated load state, the voltage Vcs reaches the voltage Vrec_ocp in response to the load 11 becoming overload state.

In response to the voltage Vcs reaching the voltage Vrec_ocp, the comparator 64 outputs the signal ocp to turn off the power transistor 30. As a result, the on period of the power transistor 30 decreases shorter than the on period in the case where the load 11 is in the rated load state.

Accordingly, when the load 11 is in the overload state, the control IC 32 reduces the power supplied to the secondary side of the transformer 22, to lower the output voltage Vout.

Operation of AC-DC Converter 10 When Load 11 is in Overload State

Figure 17:
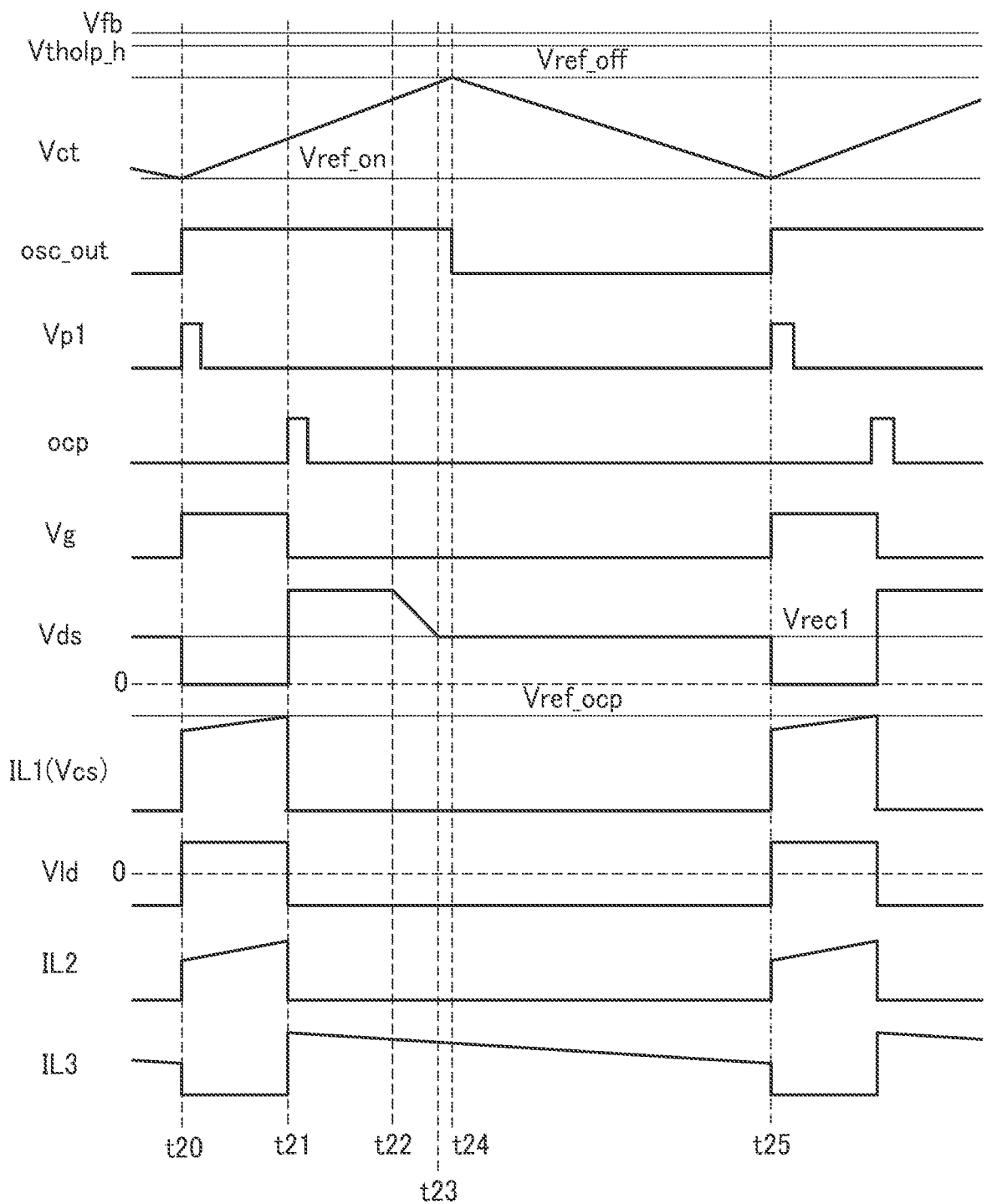
FIG. 17 is a diagram illustrating an example of an operation of a control IC 32 when a load 11 is in an overload state.

FIG. 17 is a diagram illustrating an example of an operation of the control IC 32 when the load 11 is in the overload state. Note that, similarly to FIGS. 14 to 16, the voltage Vcs in FIG. 17 is given as a positive voltage together with and similarly to the inductor current IL1.

Time t20 corresponds to the time t10, and times t22 to t25 correspond to the times t12 to 15. In this case, since the output voltage Vout drops, the feedback voltage Vfb rises higher than the voltage Vref_off.

At time t21 at which the voltage Vcs reaches the voltage Vref_ocp, the comparator 64 outputs the signal ocp to turn off the power transistor 30. Thus, the buffer 69 changes the level of the driving voltage Vg to the level of the ground voltage. Accordingly, the power transistor 30 is turned off. Note that, from the time t25, the operation from the time t20 to the time t24 is repeated.

SUMMARY

The AC-DC converter 10 according to an embodiment of the present disclosure has been described above. The control IC 32 includes the detection circuit 65, the comparator 64, the oscillator circuit 66, and the driving signal output circuit 67. The oscillator circuit 66 includes the PMOS transistors 113 and 114, the PMOS transistors 134 and 135, the adjustment circuit 132, and the output circuit 102. Accordingly, when the load 11 is in the overload state, the DC offset components of the inductor current IL1 increase, and the on period of the power transistor 30 decreases. Then, the voltage Vvf2 corresponding to the period of time during which the power transistor 30 is on in the cycle of the driving signal Vq1 decreases. When the load 11 is in the overload state, the oscillator circuit 66 outputs the oscillator signal osc_out having the decreased oscillation frequency Fosc, in order to lower the output voltage Vout. In addition, since the current Ib2 is reduced based on the voltage Vvf2 when the oscillation frequency Fosc of the oscillator signal osc_out is reduced, the drooping characteristics of the output voltage Vout are implemented with a simple circuit. Accordingly, it is possible to provide an integrated circuit capable of suppressing an abrupt change in the switching cycle of the transistor.

The control IC 32 includes the signal generation circuit 63 and the variable resistors 112 and 133. Accordingly, the resistance values R1 and R2 of the variable resistors 112 and 133 are discretely set based on the signals F1 to F3 from the signal generation circuit 63. Then, based on the resistance values R1 and R2 of the variable resistors 112 and 133, the current values of the currents Ib0 to Ib3 are set. Since the oscillator circuit 66 outputs the oscillator signal osc_out determined according to the currents Ib0 to Ib3, the oscillation frequency Fosc of the oscillator signal osc_out when the load 11 is in the rated load state is also discrete. This makes it possible to suppress changes in the cycle of the driving signal Vq1 when the output voltage Vout starts to be lowered.

The variable resistors 112 and 133 are designed such that the current Ib0 is larger than the current Ib2 when the voltage V1 and the voltage V2 have levels equal to each other. This makes it possible to easily satisfy the conditions of the maximum on-duty of the power transistor 30 in the forward power supply circuit.

The oscillator circuit 66 includes the PMOS transistors 113 and 115. The output circuit 102 includes the adder circuit 200, the capacitor 203, and the oscillator signal output circuit 204. Accordingly, even when the load 11 becomes overload state; the voltage Vvf drops; and the current Ib2 decreases, the capacitor 203 is discharged. In other words, the current value of the current corresponding to the current Ib1 can be the minimum value of the current for discharging the capacitor 203.

The detection circuit 65 includes the hysteresis comparator 90 and the output circuit 91. This makes it possible to detect that the load 11 is in the overload state based on either a drop in the output voltage Vout or overcurrent flowing through the power transistor 30.

The adjustment circuit 132 includes the selection circuit 160 and the output circuit 161. Accordingly, even when the load 11 is in the light load state or the overload state, the oscillation frequency Fosc of the oscillator signal osc_out decreases with a simple circuit. In addition, by virtue of the configurations of the selection circuit 160 and the output circuit 161, it is possible to suppressing an abrupt change in the switching cycle of the power transistor 30.

The present disclosure is directed to provision of an integrated circuit capable of suppressing an abrupt change in a switching cycle of a transistor.

It is possible to provide an integrated circuit capable of suppressing an abrupt change in a switching cycle of a transistor.

Embodiment(s) and modifications of the present disclosure described above are simply to facilitate understanding of the present disclosure and are not in any way to be construed as limiting the present disclosure. The present disclosure may variously be changed or altered without departing from its essential features and encompass equivalents thereof.

What is claimed is:

1. An integrated circuit for a power supply circuit configured to generate an output voltage from an input voltage thereof, the power supply circuit including
    a transformer including a primary coil, a secondary coil, and an auxiliary coil,
    a transistor configured to control a current flowing through the primary coil, and
    a first resistor having a first resistance value,
the integrated circuit being configured to switch the transistor, the integrated circuit comprising:
    a first terminal to which the first resistor is coupled;
    a first detection circuit configured to detect whether a load of the power supply circuit is in an overload state;
    a second detection circuit configured to detect whether a current flowing through the transistor is overcurrent;
    an oscillator circuit configured to output an oscillator signal with a cycle corresponding to the first resistance value of the first resistor; and
    a driving signal output circuit configured to
        output a driving signal to turn on the transistor, based on the oscillator signal, and
        output the driving signal to turn off the transistor, based on a feedback voltage corresponding to the output voltage, wherein
    the driving signal output circuit further outputs the driving signal to turn off the transistor, in response to the current flowing through the transistor reaching overcurrent, and
    the oscillator circuit includes
        a first current source configured to output a first current, based on the first resistance value,
        a second current source configured to output a second current, based on the first resistance value,
        an adjustment circuit configured to adjust the second current based on a voltage corresponding to a period of time during which the transistor is on in a cycle of the driving signal, to thereby cause the second current to decrease, in response to the load becoming the overload state, and
a first output circuit configured to output the oscillator signal with an on period corresponding to a current value of the first current and an off period corresponding to a current value of the second current.

2. The integrated circuit according to claim 1, further comprising:
a converter circuit configured to convert a voltage corresponding to the first resistance value into a digital value;
a second resistor, which is a variable resistor configured to have a second resistance value in response to the digital value; and
a third resistor, which is another variable resistor configured to have a third resistance value in response to the digital value, wherein
the first current source is configured to output the first current according to the second resistance value and a first voltage, and
the second current source is configured to output the second current according to the third resistance value and a second voltage.

3. The integrated circuit according to claim 2, wherein the first voltage and the second voltage have levels equal to each other, and
the first current is larger than the second current.

4. The integrated circuit according to claim 2, wherein the oscillator circuit includes a third current source configured to output a third current, and
the first output circuit includes
an adder circuit configured to obtain a fourth current by adding the third current and the second current,
a capacitor configured to be charged with the first current during the on period of the oscillator signal, and discharged with the fourth current during the off period of the oscillator signal, and
an oscillator signal output circuit configured to output the oscillator signal, based on a voltage generated at the capacitor.

5. The integrated circuit according to claim 2, wherein the first detection circuit includes
a comparator circuit configured to compare the feedback voltage with a third voltage for detecting the overload state, and
a second output circuit configured to output a detection result indicating whether the load is in the overload state, based on a comparison result of the comparator circuit or a detection result of the second detection circuit.

6. The integrated circuit according to claim 2, wherein the adjustment circuit adjusts a level of the second voltage based on the feedback voltage, to thereby cause the second current to decrease, in response to a rise in the output voltage when the load is not in a first load state, the first load state being a state in which a current value of a load current flowing through the load is larger than a predetermined value.

7. The integrated circuit according to claim 6, wherein the adjustment circuit includes
a selection circuit configured to output a voltage that
corresponds to the feedback voltage, when the load is not in the first load state, and
corresponds to the period of time during which the transistor is on, when the load is in the first load state, and
a third output circuit configured to output the second voltage for reducing the second current, based on the voltage selected by the selection circuit and a predetermined voltage.

8. A power supply circuit configured to generate an output voltage from an input voltage thereof, the power supply circuit comprising:
a transformer including a primary coil, a secondary coil, and an auxiliary coil;
a transistor configured to control a current flowing through the primary coil;
a first resistor having a first resistance value; and
the integrated circuit of claim 1, configured to switch the transistor.

* * * * *